(12) United States Patent
Chan et al.

(10) Patent No.: US 9,374,373 B1
(45) Date of Patent: Jun. 21, 2016

(54) ENCRYPTION TECHNIQUES FOR IMPROVED SHARING AND DISTRIBUTION OF ENCRYPTED CONTENT

(71) Applicant: Hong Kong Applied Science and Technology Research Institute Co., Ltd., Shatin, New Territories (HK)

(72) Inventors: Chung Fai Aldar Chan, Kowloon (HK); Man Ming Andrew Hon, New Territories (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 14/613,062

(22) Filed: Feb. 3, 2015

(51) Int. Cl.
| | |
|---|---|
| *H04L 9/00* | (2006.01) |
| *H04L 29/06* | (2006.01) |
| *H04L 9/32* | (2006.01) |

(52) U.S. Cl.
CPC .......... *H04L 63/0876* (2013.01); *H04L 9/3247* (2013.01); *H04L 63/0464* (2013.01); *H04L 63/123* (2013.01)

(58) Field of Classification Search
CPC ........... H04L 9/12; H04L 9/08; H04L 9/3223; H04L 9/3236; H04L 9/3242; G06F 21/72
USPC ........ 380/262, 44; 713/170, 181, 189; 705/51
See application file for complete search history.

(56) References Cited

U.S. PATENT DOCUMENTS

| | | | |
|---|---|---|---|
| 6,874,085 B1 | 3/2005 | Koo et al. | |
| 7,788,728 B2 * | 8/2010 | Kim | G06F 21/10 380/259 |
| 8,094,810 B2 | 1/2012 | Hohenberger et al. | |
| 8,185,411 B2 | 5/2012 | Allard et al. | |
| 8,229,121 B2 * | 7/2012 | Ju | H04L 9/0836 380/277 |
| 8,416,949 B2 * | 4/2013 | Asano | H04L 9/0866 380/277 |
| 8,448,240 B2 | 5/2013 | Hammoutene et al. | |
| 9,197,404 B2 * | 11/2015 | Seleznev | H04L 9/08 |
| 2009/0193267 A1 | 7/2009 | Chung | |
| 2011/0022414 A1 | 1/2011 | Ge et al. | |
| 2012/0260094 A1 | 10/2012 | Asim et al. | |
| 2013/0024701 A1 | 1/2013 | Hwang et al. | |

FOREIGN PATENT DOCUMENTS

| | | |
|---|---|---|
| CN | 10211269 | 6/2011 |
| EP | 2680528 A1 | 1/2014 |
| WO | WO-2011045723 A1 | 4/2011 |

\* cited by examiner

*Primary Examiner* — Hosuk Song
(74) *Attorney, Agent, or Firm* — Norton Rose Fulbright US LLP

(57) ABSTRACT

In an embodiment, content may be encrypted by a first device using a dual hash chain technique, where the first device maintains a forward hash chain and a second device maintains a backward hash chain, and content keys for encrypting content are derived using values of the forward and backward hash chains. The second device may not have knowledge of a seed used to generate the forward hash chain, and therefore may be unable to generate the content keys, reducing a likelihood that the encrypted content becomes compromised. Additionally, embodiments provide for techniques for using proxy re-encryption (PRE) to re-encrypt content, such that the encrypted content may be provided to and decrypted by a requesting device without knowledge of the forward and backward hash chains. Additionally, embodiments provide techniques for distributing encrypted content to a requesting device with fine-grained access control.

33 Claims, 13 Drawing Sheets

ENCRYPTION TECHNIQUES FOR IMPROVED SHARING AND DISTRIBUTION OF ENCRYPTED CONTENT

TECHNICAL FIELD

The present disclosure is generally related to techniques for encrypting content. More particularly, the present disclosure is related to encryption techniques using dual hash chains and proxy re-encryption, and techniques for sharing encrypted content.

BACKGROUND OF THE INVENTION

Encryption of content has become widespread as a technique for securely storing and distributing or sharing content between a content creator and a content consumer. As the use of encryption has grown, the complexity of various encryption techniques has also increased, thereby increasing the computational resources needed to encrypt and/or decrypt content and increasing the computational cost of encrypting and/or decrypting content. Additionally, when content that has been encrypted by a content creator is distributed or shared with the content consumer, a content key must be provided to the content consumer, where the content key allows the content consumer to decrypt the content. However, sharing content keys with the content consumer may increase the likelihood that the content consumer is able to decrypt other content that has been encrypted by the content creator, or may allow the content consumer to access content that the content creator does want the content consumer to have access to. Additionally, when the encrypted content is stored in a network environment, such as at a network server or a cloud server, the content may need to be retrieved by the content provider and re-encrypted prior to providing the content to the content consumer.

SUMMARY OF THE INVENTION

Systems, methods, apparatuses, and computer-readable storage media providing improved techniques for encrypting/decrypting content and distributing encrypted content are disclosed. In an embodiment, the systems, methods, apparatuses, and computer-readable storage media of embodiments generate content keys for encrypting content using a dual hash chain technique, where a first device (e.g., a device associated with content creator) maintains a first hash chain (e.g., a forward hash chain), and a second device (e.g., a device where the encrypted content is to be stored) maintains a second hash chain (e.g., a backward hash chain). The dual hash chains may be generated based on hash chain seeds (e.g., a forward hash chain seed and a backward hash chain seed) generated by the first device, and the content keys may be generated based on pairs of hash chain values, where each pair of hash chain values includes a forward hash chain value derived by hashing the forward hash chain and a backward hash chain value derived by hashing the backward hash chain. Thus, the dual hash chain techniques of embodiments may provide a key evolution technique whereby the content keys for encrypting content evolve or change over time. Additionally, because the second device only has access to the backward hash chain seed, the second device may be unable to generate content keys for encrypting/decrypting content that has been encrypted by the first device. Thus, if the second device is compromised, the encrypted content stored at the second device by the first device may remain secure.

Additionally, the systems, methods, apparatuses, and computer-readable storage media of embodiments may use a proxy re-encryption (PRE) technique to provide content consumers with access to the encrypted content. For example, when a third device (e.g., a device associated with a content consumer) requests access to content that has been encrypted by the first device, the first device may use PRE to generate a re-encryption key that may be used to re-encrypt the requested content such that the third device may decrypt the content without providing the second device and/or the third device with a secret key associated with the first device. Furthermore, the systems, methods, apparatuses, and computer-readable storage media of embodiments provide a technique for generating credentials that provide fine-grained access to encrypted content, such that the first device may grant access to particular encrypted content without granting access to all encrypted content. In an embodiment, the PRE techniques of embodiments may be used independent of the dual hash chain techniques of embodiments. In an additional or alternative embodiment, the PRE techniques of embodiments may be used in conjunction with the dual hash chain techniques of embodiments.

The foregoing has outlined rather broadly the features and technical advantages of the present disclosure in order that the detailed description that follows may be better understood. Additional features and advantages of the embodiments will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure

DESCRIPTION OF THE DRAWINGS

For a more complete understanding of the present disclosure, reference is now made to the following descriptions taken in conjunction with the accompanying drawings, in which.

DETAILED DESCRIPTION OF THE INVENTION

Figure 1:
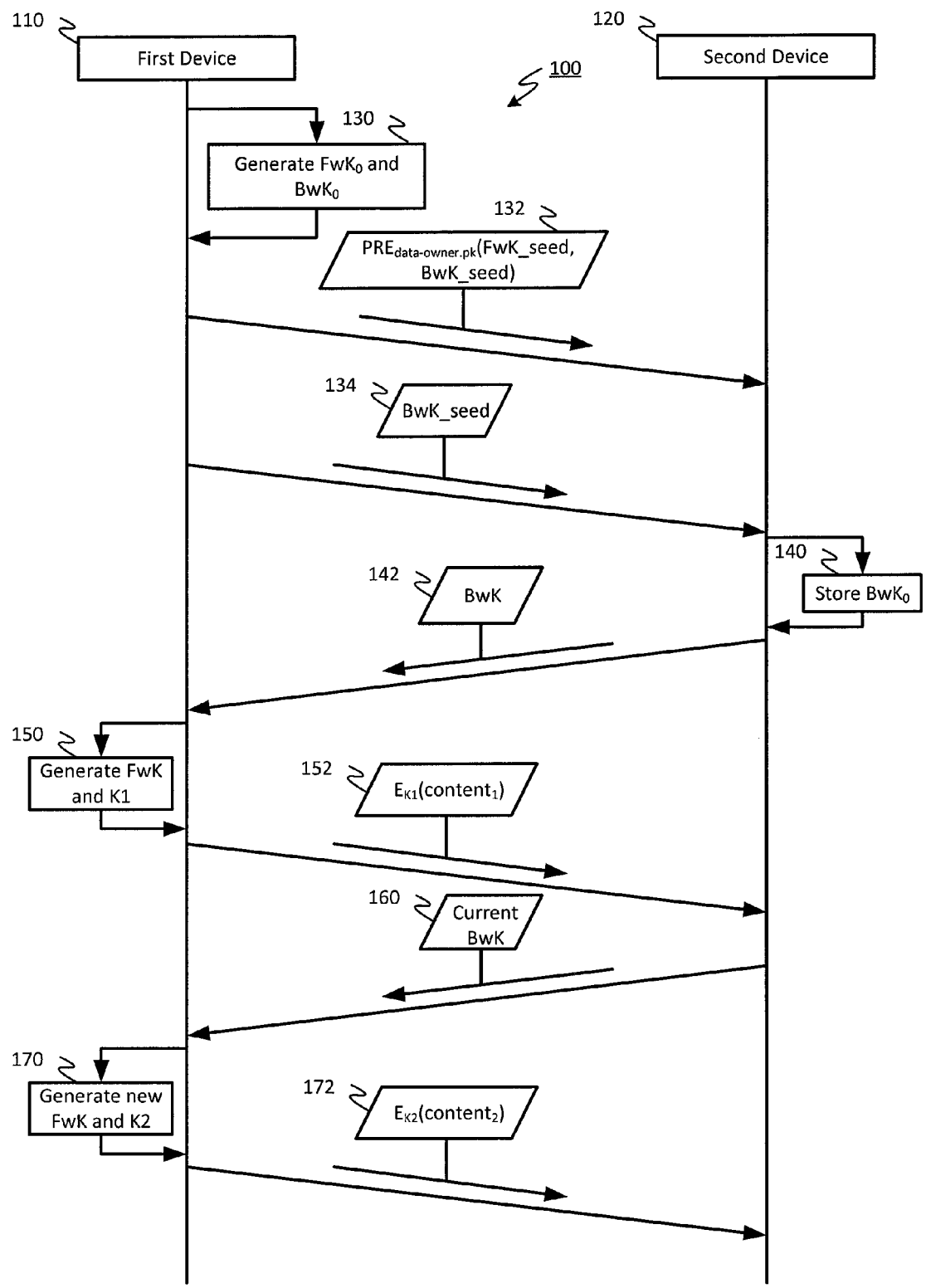
FIG. 1 is a ladder diagram of an embodiment of a system for encrypting content and storing the encrypted content.

Referring to FIG. 1, a ladder diagram of an embodiment of a system for encrypting content and storing the encrypted content is shown as a system 100. As shown in FIG. 1, the system 100 include a first device 110 and a second device 120. In an embodiment, the first device 110 and the second device 120 may be communicatively coupled via a wired or wireless link facilitated by one or more wired and/or wireless networks. The first device 110 may be configured to generate and encrypt content using proxy re-encryption (PRE) and double hash chain techniques, and to store the encrypted content at the second device 120, as described in more detail below. Additionally, the first device 110 may be configured to validate requests for access to encrypted content that has been stored at the second device 120 from other devices (not shown in FIG. 1), and to generate credentials that allow fine grained access by the other devices to particular encrypted content stored at the second device 120, as described with reference to FIGS. 10-13.

In an embodiment, the first device 110 may be a personal computing device, a laptop computing device, a tablet computing device, a smartphone, a personal digital assistant (PDA) device, a smartwatch device, a server, or another device configured according to embodiments of the first device 110. Additionally, the first device 110 may include one or more processors and a memory. The one or more processors may include one or more digital signal processors (DSPs), one or more central processing units (CPUs), a single CPU with multiple processing cores, one or more application specific integrated circuits (ASICs), or other forms of circuitry and/or logic operable to process data to facilitate operation of the first device 110 according to embodiments. The memory may include read only memory (ROM), random access memory (RAM), hard disk drive(s) (HDDs), solid state drive(s) (SSDs), programmable memory devices (e.g., erasable programmable ROM (EPROM) and electrically erasable programmable ROM (EEPROM), etc.), and/or other memory device configured to store data in a persistent or non-persistent state. In an embodiment, the memory may store instructions that, when executed by the processor of the first device 110, may cause the first device 110 to perform operations described in connection with the first device 110 with reference to FIGS. 1-13.

In an embodiment, the second device 120 may be a personal computing device, a laptop computing device, a tablet computing device, a smartphone, a personal digital assistant (PDA) device, a smartwatch device, a server, a cloud-based computing resource, or another device configured according to embodiments of the second device 120. Additionally, the second device 120 may include one or more processors and a memory. The one or more processors may include one or more digital signal processors (DSPs), one or more central processing units (CPUs), a single CPU with multiple processing cores, one or more application specific integrated circuits (ASICs), or other forms of circuitry and/or logic operable to process data to facilitate operation of the second device 120 according to embodiments. The memory may include read only memory (ROM), random access memory (RAM), hard disk drive(s) (HDDs), solid state drive(s) (SSDs), programmable memory devices (e.g., erasable programmable ROM (EPROM) and electrically erasable programmable ROM (EEPROM), etc.), and/or other memory device configured to store data in a persistent or non-persistent state. In an embodiment, the memory may store instructions that, when executed by the processor of the second device 120, may cause the second device 120 to perform operations described in connection with the second device 120 with reference to FIGS. 1-13.

During operation of the system 100 according to embodiments, the first device 110 may generate a forward seed (FwK_seed) and a backward seed (BwK_seed), as shown at 130. The FwK_seed and the BwK_seed may be used to generate dual hash chains (e.g., a forward hash chain and a backward hash chain). The dual hash chains (e.g., the forward hash chain and the backward hash chain) may be used to generate forward hash chain values and backward hash chain values, respectively, that may be used to generate content keys for encrypting and decrypting content.

Figure 2:
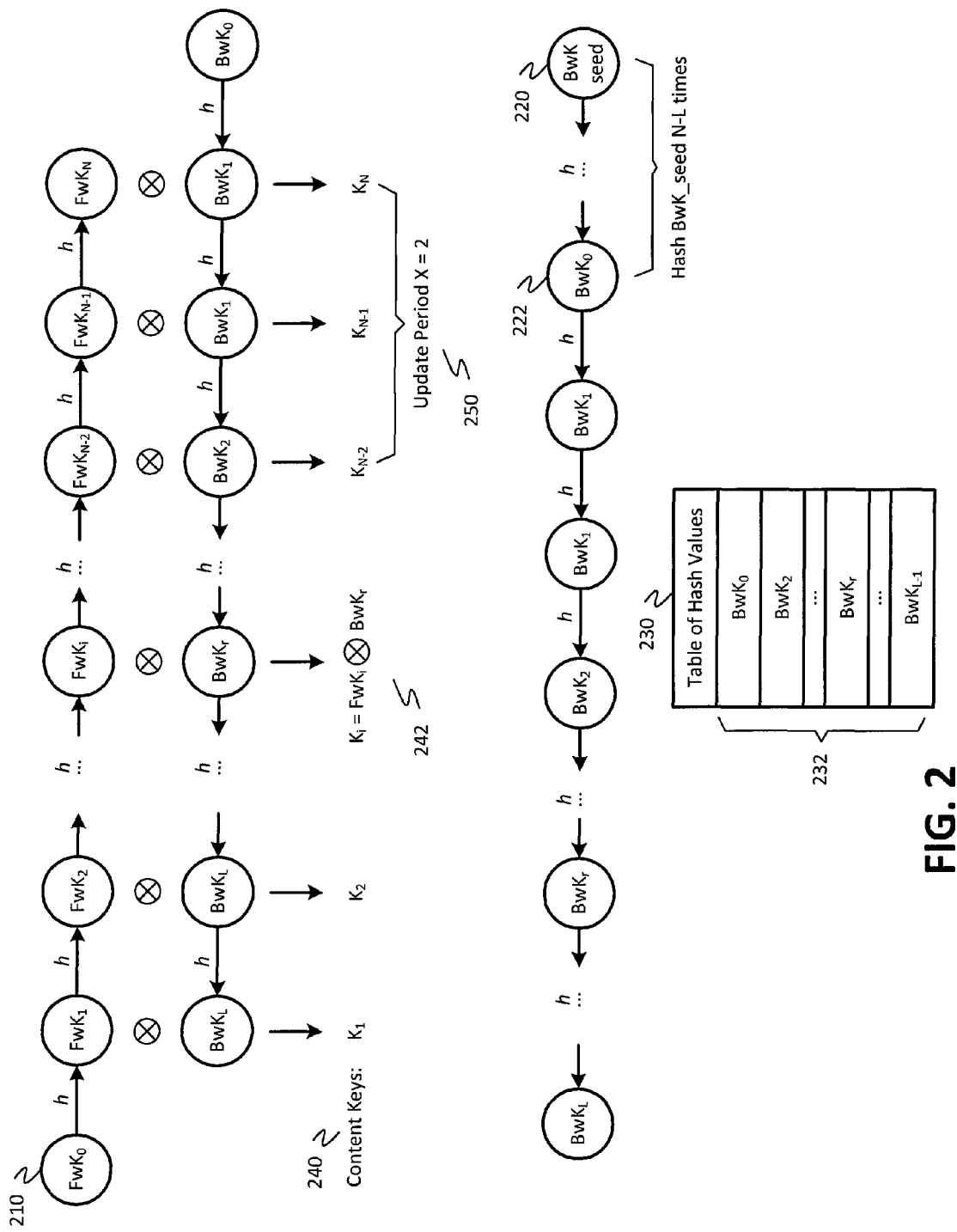
FIG. 2 is an illustrative embodiment of generating dual hash chains for use in generating content keys for encrypting and decrypting content.

For example, and referring to FIG. 2, an illustrative embodiment of generating dual hash chains for use in generating content keys for encrypting and decrypting content is shown. In FIG. 2, a forward hash chain having an initial value ($FwK_0$) 210 and a backward hash chain having an initial backward hash chain value ($BwK_0$) 222 are shown. Hash chain values for generating content keys 240 may be determined by hashing the forward hash chain and the backward hash chain using a hash function h. In an embodiment, h may be a one-way hash function that allows computation of hash chain values for each of the dual hash chains in a first direction but not in the reverse direction. As an example, as shown in FIG. 2, hashing $FwK_0$ using h results in a first forward hash chain value $FwK_1$. Because h is a one-way hash function, $FwK_0$ may not be derived using $FwK_1$ and h.

In an embodiment, h may be used to hash the forward hash chain and the backward hash chain may be hashed using h at different frequencies. For example, the forward hash chain may be hashed using h each time that a first device (e.g., the first device 110 of FIG. 1) encrypts content, and the backward hash chain may be hashed using h based on an update period X. To illustrate, in FIG. 2, X=2, meaning that the backward hash chain is hashed using h after two pieces of encrypted content are received from the first device. That is to say that a same backward hash chain value ($BwK_1$) may be used to generate multiple content keys. For example, in FIG. 2, content keys $K_{N-1}$ and $K_N$ may be generated using $BwK_1$. The backward hash chain may be hashed using h to generate a new backward hash chain value every X times content is encrypted. In contrast to the frequency at which the backward hash chain is hashed using h (e.g., once every X times content is encrypted), the forward hash chain may be hashed using h each time that content is encrypted. As shown in FIG. 2, although the content keys $K_{N-1}$ and $K_N$ may be generated using a single backward hash chain value (e.g., $BwK_1$), different forward hash chain values may be used. For example, the content key $K_{N-1}$ may be generated using forward hash chain value ($FwK_{N-1}$) and the content key $K_N$ may be generated using forward hash chain value ($FwK_N$). Thus, the frequency at which h is used to hash the forward hash chain and the backward hash chain may be different (i.e., assuming X>1). In an embodiment, X may be determined by the first device and communicated to a second device (e.g., the second device 120 of FIG. 1) during an initialization procedure. In an additional or alternative embodiment, X may be determined by the second device independently of the first device.

Initial hash chain values for the forward hash chain and the backward hash chain may be determined based on FwK_seed and BwK_seed respectively. In an embodiment, the initial forward hash chain value 210 may be set equal to FwK_seed. As shown in FIG. 2, the initial backward hash chain value 222 may be generated by hashing the BwK_seed N−L times, where N may be associated with a hash chain length, and where L=(N/X). In an embodiment, N may correspond to a maximum forward hash chain length. Thus, from the relationship L=(N/X), it can be seen that N content keys 240 may be generated using L backward hash chain values and N forward hash chain values.

As briefly described above, the forward hash chain values and the backward hash chain values may be used to generate the content keys 240 that may be used to encrypt and decrypt content. For example, as shown at 242, a content key ($K_i$) may be generated based on a forward hash chain value ($FwK_i$) and a backward hash chain value ($BwK_r$). In an embodiment, the content keys 240 may be generated by performing a bitwise exclusive or (XOR) operation with respect to a particular forward hash chain value and a particular backward hash chain value. For example, $K_i$ may be generated by performing a bitwise XOR operation with respect to $FwK_i$ and $BwK_r$, as indicated at 242.

In an embodiment, the second device may precompute a plurality of backward hash chain values (e.g., milestone backward hash chain values) using h, and may store the milestone backward hash chain values in a table 230, as shown in FIG. 2. The table 230 may include entries 232, where each of the entries 232 is associated with one of the milestone backward hash chain values. Intermediate backward hash chain values (e.g., backward hash chain values not stored in the table 230) may be derived by selecting a particular milestone backward hash chain value from the table 230, and hashing the particular milestone backward hash chain value using h. For example, as shown in FIG. 2, the table 230 includes an entry $BwK_2$. The second device may hash $BwK_2$ using h to compute intermediate backward hash chain value $BwK_3$ from the table 230, thereby eliminating the need to hash $BwK_0$ and $BwK_1$ using h to compute the backward hash chain value $BwK_3$. Thus, precomputing the milestone backward hash chain values and storing them in the table 230 may reduce computational resources required to generate backward hash chain values by the second device. Additionally, the milestone backward hash chain values stored at the table 230 may reduce an amount of time required to generate new backward hash chain values, which may allow the second device to process more backward hash chains (e.g., the backward hash chain associated with the first device and other backward hash chains associated with other devices), thereby allowing the second device to serve a larger number of devices, and freeing up computational resources for additional operations, such as processing requests for content stored at the second device.

Referring back to FIG. 1, after generating FwK_seed and BwK_seed, at 130, the first device may encrypt FwK_seed and BwK_seed to produce encrypted seed information, and may, at 132, transmit the encrypted seed information to the second device. In an embodiment, a proxy re-encryption (PRE) technique may be used to encrypt FwK_seed and BwK_seed. In an embodiment, a public key associated with the first device 110 may be used to encrypt FwK_seed and BwK_seed using the PRE technique. Additionally, as shown at 134, the first device 110 may transmit BwK_seed to the second device 120, where the second device 120 uses BwK_seed to generate a backward hash chain, as described with reference to FIG. 2. This is in contrast to other encryption techniques that utilize dual hash chains, but where the seeds for the hash chains are hidden from a receiving device. In an embodiment, the first device 110 may also transmit N (e.g., the hash chain length described with reference to FIG. 2) to the second device 120.

By using the public key associated with the first device 110 to generate the encrypted seed information, only the first device 110 may decrypt the encrypted seed information. That is to say, the second device, upon receiving the encrypted seed information, may not be able to decrypt the encrypted seed information to obtain both FwK_seed and BwK_seed, which are used to generate content keys for encrypting and decrypting content, as described with reference to FIG. 2. Therefore, even though the second device 120 received BwK_seed, the second device 120 may not compute the content keys (e.g., the content keys 240 of FIG. 2) used by the first device 110 to encrypt and decrypt content. In an embodiment, after transmitting BwK_seed and the encrypted seed information to the second device 120, the first device 110 may delete BwK_seed. Thus, the first device 110 may maintain the forward hash chain and the second device 120 may maintain the backward hash chain.

At 140, the second device 120 may store BwK_seed. In an embodiment, the second device may initialize the backward hash chain (e.g., by hashing BwK_seed N−L times to produce $BwK_0$, as described with reference to FIG. 2). At 142, the second device 120 may transmit a backward hash chain value (e.g., BwK) to the first device 110. When content is to be encrypted by the first device 110, the first device 110 may hash the forward hash chain to generate a first forward hash chain value (FwK), and may generate a first content key based on FwK and BwK. In an embodiment, the first content key may be generated by performing a bitwise XOR operation with respect to FwK and BwK, as described with reference to FIG. 2.

The first device 110 may encrypt the content using the first content key to produce first encrypted content ($E_{K1}$(content$_1$)), and, at 152, may transmit the first encrypted content to the second device 120. Upon receiving the first encrypted content from the first device 110, the second device 120 may determine whether to hash the backward hash chain using h (e.g., the hash function described with reference to FIG. 2). In an embodiment, the determination of whether to hash the backward hash chain using h may be based on X (e.g., the update period of FIG. 2). For example, the second device 110 may hash the backward hash chain using h once for every X times the first device 110 transmits encrypted content to the second device 120. The value of BwK may be updated or changed each time that the backward hash chain is hashed using h.

As shown at 160, in response to receiving the first encrypted content and determining whether to hash the backward hash chain using h, the second device 120 may send a current value of BwK to the first device 110. In an embodiment, the current value of BwK may be the same as a previously provided value of BwK, as described with reference to $K_{N-1}$ and $K_N$ of FIG. 2, or may be different from a previously provided value of BwK (e.g., when h is used to hash the backward hash chain). Subsequently, when second content is to be encrypted by the first device 110, the first device 110 may hash the forward hash chain value to generate a new FwK value. The new FwK value and the current BwK value may be used to generate a second content key that may be used to encrypt the second content to produce second encrypted content ($E_{K2}$(content$_2$)). The second encrypted content may be provided, at 172, from the first device 110 to the second device 120. The second device 120 may store the second content.

By generating content keys using the dual hash chains, as described with reference to FIGS. 1 and 2, the first device 110 may encrypt and securely store content at a remote device, such as the second device 120, irrespective of whether the remote device is a trusted device. One reason that this is true is that both the forward hash chain value and the backward hash chain value used to generate the content key for encrypting particular content may only be derived using both the forward hash chain and the backward hash chain, however, the second device (e.g., a server, etc.) only has knowledge of the backward hash chain. Thus, without knowledge of the forward hash chain, the second device 120 may not derive content keys that may be used to decrypt content that has been encrypted by the first device 110 based on the forward hash chain and the backward hash chain. Additionally, although FwK_seed and BwK_seed, from which the forward and backward hash chains are generated, are stored at the second device 120, FwK_seed and BwK_seed have been encrypted using PRE and a public key associated with the first device 110, and therefore the encrypted seed information may only be decrypted by the first device 110 using a private key associated with the first device 110 or a device that has been provided a credential that includes a re-encryption key (e.g., a PRE re-encryption key) generated by the first device 110, as described in more detail below. Thus, the system 100 provides an improved technique for encrypting content using dual hash chains and proxy re-encryption. Additional aspects and advantages of techniques for encrypting and decrypting content using dual hash chains and proxy re-encryption according to embodiments are described in more detail with respect to FIGS. 3-13.

Figure 3:
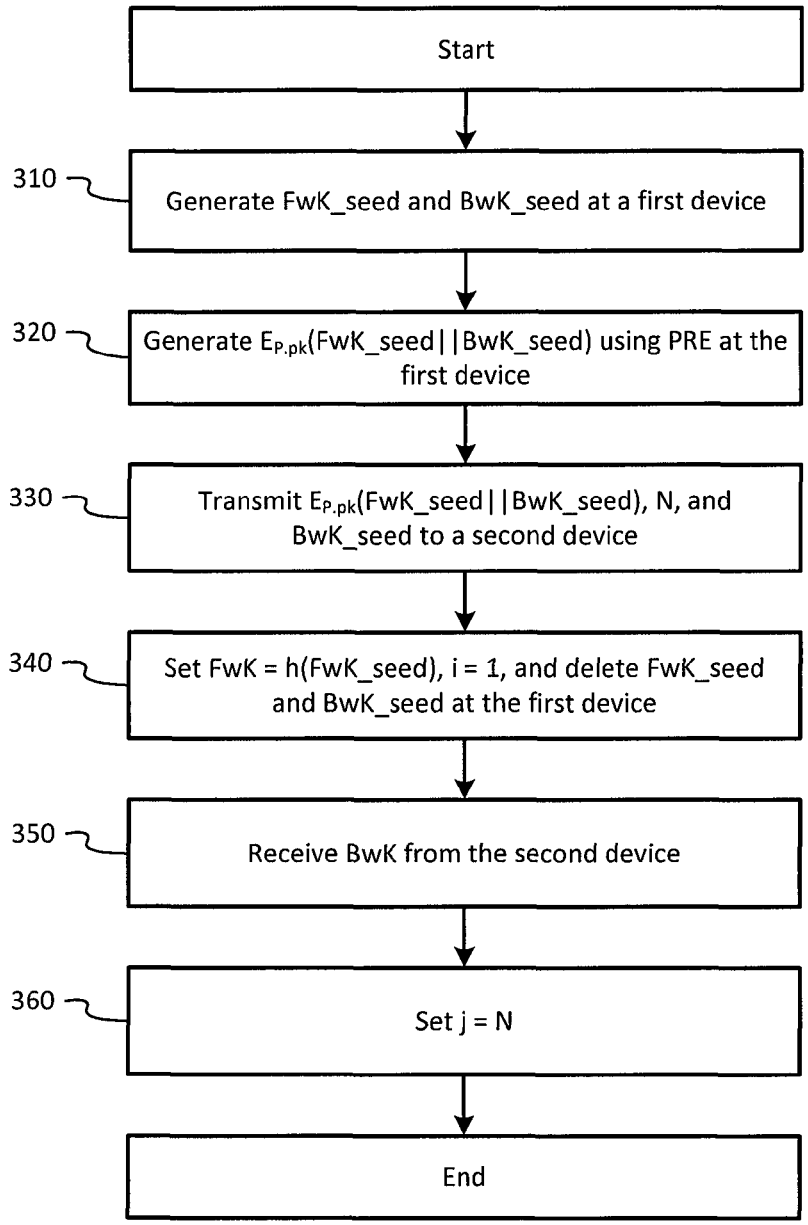
FIG. 3 is a flowchart of an exemplary embodiment of a method for initializing a device for encrypting content according to embodiments.

Referring to FIG. 3, a flowchart of an exemplary embodiment of a method for initializing a device for encrypting content according to embodiments is shown as a method 300. In an embodiment, the method 300 may be performed by the first device 110 of FIGS. 1 and 10. In an embodiment, the method 300 may be stored as instructions in a memory (e.g., the memory of the first device 110 of FIGS. 1 and 10), where the instructions, when executed by one or more processors, cause the one or more processors to perform operations of the method 300.

As shown in FIG. 3, the method 300 may include generating a forward seed (FwK_seed) and a backward seed (BwK_seed). In an embodiment, FwK_seed and BwK_seed may be the FwK_seed and the BwK_seed described with reference to FIGS. 1 and 2, and may be used to generate dual hash chains (e.g., a forward hash chain and a backward hash chain), as described with reference to FIG. 2. At 320, the method 300 includes encrypting FwK_seed and BwK_seed to produce encrypted seed information ($E_{P.pk}$(FwK_seed∥BwK_seed)), where ∥ denotes concatenation of the two bit strings (e.g., concatenation of FwK_seed and BwK_seed). In an embodiment, $E_{P.pk}$(FwK_seed∥BwK_seed) may be generated using a proxy re-encryption technique, where P.pk corresponds to a public key associated with the first device. Thus, $E_{P.pk}$(FwK_seed∥BwK_seed) may only be decrypted using a private key (P.sk) associated with the first device.

At 330, the method 300 includes transmitting a message to a second device (e.g., the second device 120 of FIG. 1). In an embodiment, the message may include the encrypted seed information ($E_{P.pk}$(FwK_seed∥BwK_seed)), a hash chain length N (e.g., N of FIG. 2), and BwK_seed. The second device may store the encrypted seed information, and may use N and BwK_seed to generate a backward hash chain, as described with reference to FIG. 2. At 340, the method 300 includes initializing a forward hash chain (FwK) by hashing FwK_seed using a hash function h. In an embodiment, h may be a one-way hash function, as described with reference to FIG. 2. Additionally, at 340, the method 300 may include initializing a first hash count (i), where i represents a number of times that the forward hash chain has been hashed using h. For example, at 340, i may be initially set equal to 1. Further, at 340, the method 300 may include deleting FwK_seed and/or BwK_seed. Deleting FwK_seed and BwK_seed may prevent a third party from obtaining FwK_seed and BwK_seed (e.g., if the first device is compromised), which could then be used to generate forward and backward hash chains that could be used to generate content keys to decrypt content that has been encrypted by the first device. In an additional or alternative embodiment, FwK_seed and BwK_seed may be generated by a trusted third party, rather than the first device, and the third party may transmit the encrypted seed information and BwK_seed to a second device, and may provide the FwK_seed to the first device. In an embodiment, the third party may delete the FwK_seed and the BwK_seed after providing the FwK_seed to the first device and after providing the encrypted seed information and BwK_seed to the second device.

At 350, the method 300 may include receiving a backward hash chain value (BwK) from the second device, where BwK corresponds to a current backward hash chain value of the backward hash chain maintained at the second device, and where the backward hash chain is derived by the second device using BwK_seed provided at 330. At 360, the method 300 includes initializing a second hash count (j), where j represents a number of times that the backward hash chain has been hashed by the second device using h. The first device may use the current hash values of the forward and backward hash chains (e.g., FwK and the backward hash chain value (BwK)) to generate a content key K for encrypting content.

Figure 4:
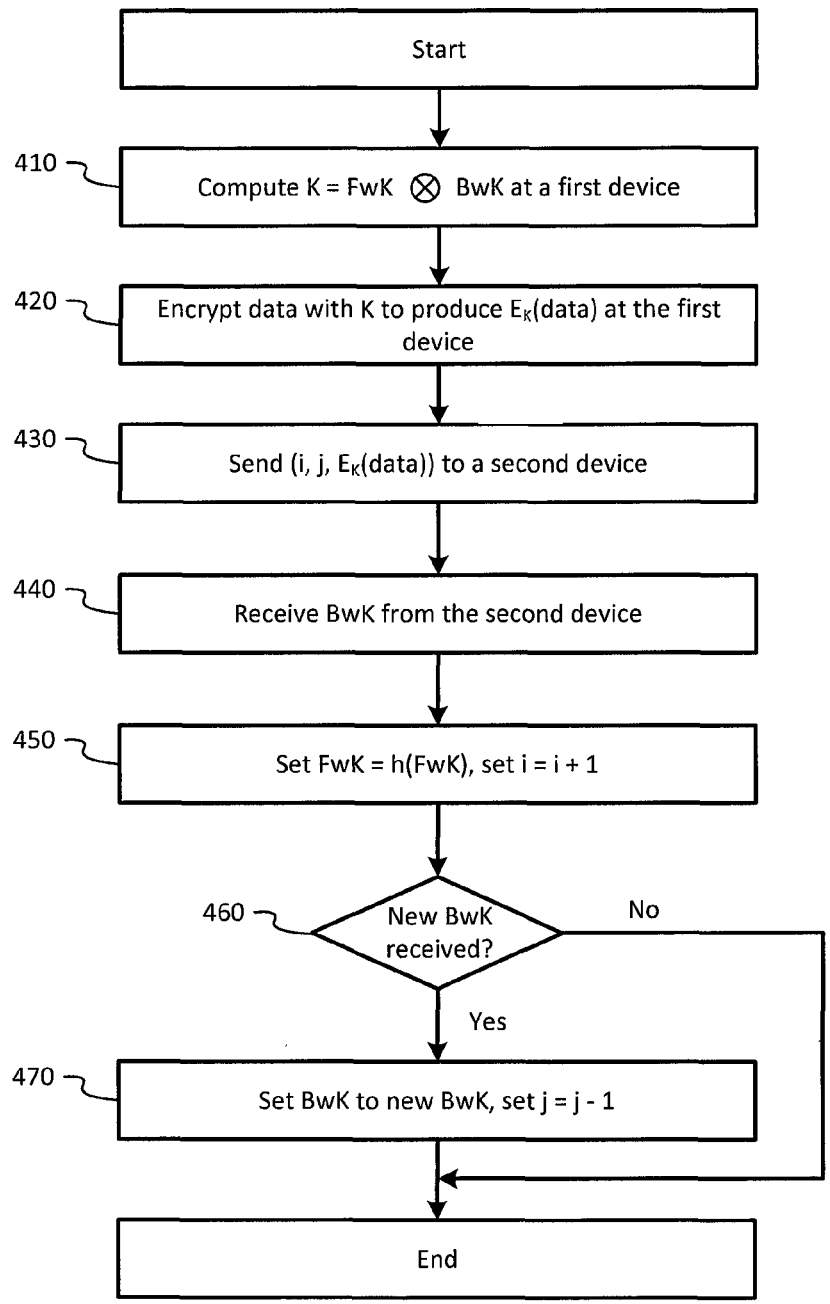
FIG. 4 is a flowchart of an exemplary embodiment of a method for generating a content key for encrypting content at a first device according to embodiments.

For example, and referring to FIG. 4, a flowchart of an exemplary embodiment of a method for generating a content key for encrypting content at a first device according to embodiments is shown as a method 400. In an embodiment, the method 400 may be performed by the first device 110 of FIG. 1. In an embodiment, the method 400 may be stored as instructions in a memory (e.g., the memory of the first device 110 of FIG. 1), where the instructions, when executed by one or more processors, cause the one or more processors to perform operations of the method 400.

At 410, the method 400 may include computing a content key (K) based on current values of the forward and backward hash chains, where the current value of the forward hash chain is determined by the first device, and the current value of the backward hash chain is determined by a second device and provided to the first device (e.g., as described with reference to step 350 of FIG. 3). In an embodiment, K may be computed by performing a bitwise exclusive or (XOR) operation with respect to the current values of the forward and backward hash chains. For example, K may be computed as K=FwK⊗BwK, where FwK corresponds to the current value of the forward hash chain, where BwK corresponds to the current value of the backward hash chain, and where ⊗ represents a bitwise XOR operation. At 420, the method 400 may include encrypting content with K to produce encrypted content ($E_K$(content)) at the first device. In an embodiment, the content may be encrypted with K using a symmetric key encryption mode (e.g., an advanced encryption standard (AES)-counter cipher block chaining message authentication code (CCM)).

At 430, the method 400 includes sending the encrypted content to the second device. In an embodiment, the encrypted content may be sent to the second device in a message that includes the encrypted content, a current value of the first hash count, and a current value of the second hash count. In response to receiving the message, the second device may generate and store a record that includes the encrypted content and the current values of the first and second hash counts. When the encrypted content needs to be decrypted, the first device may retrieve the record and may use the first and second hash count values included in the record to derive the content key K used to encrypt the content, as described with reference to FIG. 5.

At 440, the method 400 may include receiving a current value of the backward hash chain (BwK) from the second device. In response to receiving the current value of the backward hash chain (BwK) from the second device at step 440, the method 400 may include hashing the forward hash chain using h to derive a new current forward hash chain value (FwK) and updating the first hash count to reflect that the forward hash chain has been hashed using h. In an embodiment, updating the first hash count may include incrementing the first hash count (e.g., i=i+1). In an additionally or alternative embodiment, updating the first hash count may include decrementing the first hash count (e.g., i=i−1). However, it is noted that decrementing i would require slight modification of the FIGs. Therefore, in the FIGs., it is assumed that i is incremented, rather than decremented for simplicity of the present disclosure.

At 460, the method 400 may include determining whether the current value of the backward hash chain (BwK) is a new backward hash chain value. In an embodiment, the current value of the backward hash chain (BwK) may be the same as a previously received value of the backward hash chain. That is to say, the current value of the backward hash chain received at 440 may be the same as a previously received current value of the backward hash chain (e.g., the current value of the backward hash chain (BwK) received at step 350 of FIG. 3). For example, as explained with reference to FIGS. 1 and 2, the forward hash chain and the backward hash chain may evolve (e.g., be hashed using h) at different frequencies (e.g., based on X). For example, the forward hash chain may be hashed using h to derive a new current value of the forward hash chain (FwK) each time that the first device encrypts content, while the second device may hash the backward hash chain once for every X pieces of content received from the first device. In an embodiment, the current value of the backward hash chain (BwK) may be the same as a previously received value of the backward hash chain. For example, if the encrypted content provided at step 430 was the $X^{th}$ piece of content received from the first device at the second device, the second device may hash the backward hash chain using h to derive a new current value of the backward hash chain (BwK).

Thus, the $X^{th}$ piece of content and the $X^{th}$−1 piece of content may have been encrypted using content keys generated from different forward hash chain values and a same backward hash chain value. An $X^{th}$+1 piece of content may be encrypted using a content key generated from a forward hash chain value that is different from the forward hash chain values used to generate the content keys used to encrypt the $X^{th}$ and $X^{th}$−1 pieces of content, and from a backward hash chain value that is different from the backward hash chain value used to generate the content keys used to encrypt the $X^{th}$ and $X^{th}$−1 pieces of content (e.g., because the a new backward hash chain value was generated by hashing the backward hash chain in response to receiving the $X^{th}$ piece of content). Additional aspects of determining whether to hash the backward hash chain using h based on the update period X are described with reference to FIG. 7.

In response to a determination, at 460, that the current value of the backward hash chain (BwK) received at step 440 is a new current backward hash chain value, the method 400 may include, at 470, setting BwK equal to the current value of the backward hash chain (BwK) received at step 440, and updating the second hash count to reflect that the backward hash chain has been hashed by the second device using h. In an embodiment, updating the second hash count may include decrementing the second hash count (e.g., j=j−1). In an additional or alternative embodiment, updating the second hash count may include incrementing the second hash count (e.g., j=j+1). However, it is noted that incrementing j would require slight modification of the FIGs. Therefore, in FIG. 4, it is assumed that j is decremented, rather than incremented for simplicity of the present disclosure.

Thus, in contrast to other techniques for encrypting content using dual hash chains that require a single device to maintain both the forward and backward hash chains, and that do not provide the backward seed (BwK_seed) to another device, the method 400 provides a technique for encrypting content using forward and backward hash chains, where the device performing the encryption (e.g., the first device) maintains the forward hash chain, and another device (e.g., the second device) maintains the backward hash chain. This may reduce a likelihood that a third party device may obtain both the forward seed (FwK_seed) and the backward seed (BwK_seed), thereby reducing a likelihood that the third party device may access the encrypted content without obtaining authorization from the encrypting device. Additionally, because the second device only has knowledge of the backward seed (BwK_seed), the second device is unable to decrypt the encrypted content stored at the second device by the first device. Thus, the method 400 of embodiments provides an improved technique for encrypting content using dual hash chains. Additional advantages and aspects of the techniques for encrypting content using dual hash chains according to embodiments are disclosed elsewhere herein.

Figure 5:
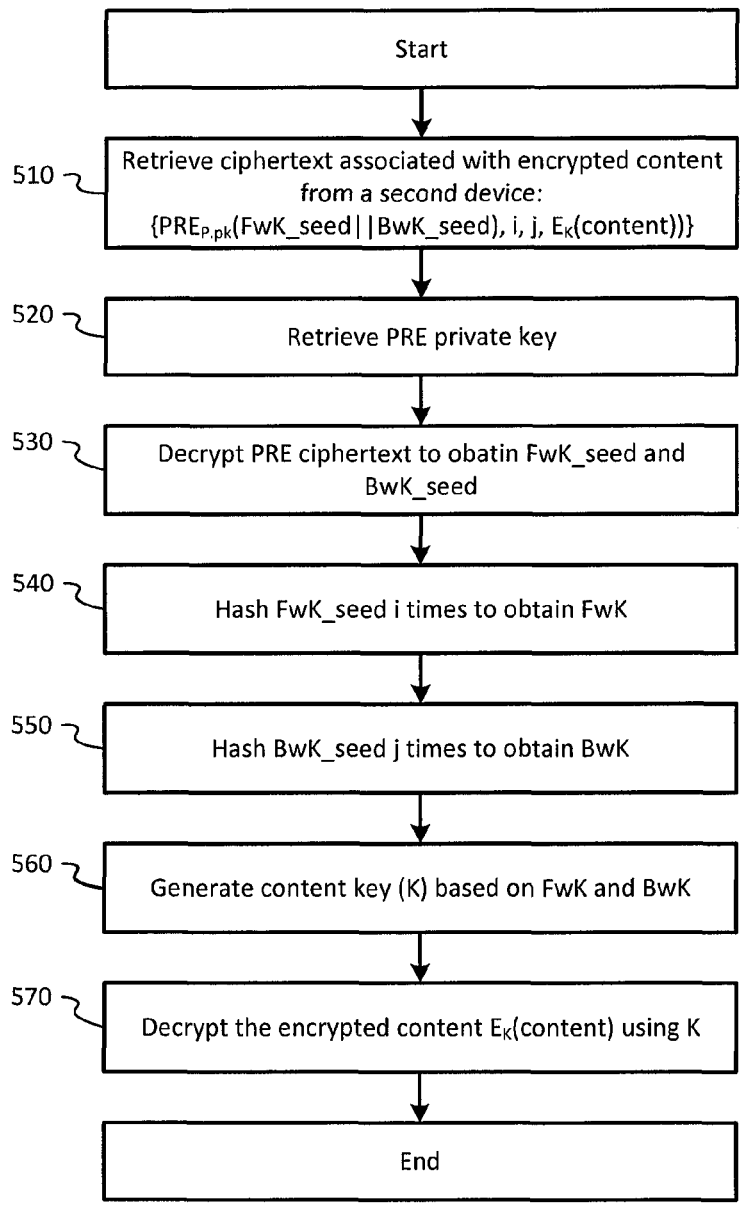
FIG. 5 is a flowchart of an exemplary embodiment of a method for decrypting content that has been encrypted using a content key generated using a forward hash chain and a backward hash chain according to embodiments.

Referring to FIG. 5, a flowchart of an exemplary embodiment of a method for decrypting content that has been encrypted using a content key generated using a forward hash chain and a backward hash chain according to embodiments is shown as a method 500. In an embodiment, the method 500 may be performed by the first device 110 of FIGS. 1 and 10. In an embodiment, the method 500 may be stored as instructions in a memory (e.g., the memory of the first device 110 of FIGS. 1 and 10), where the instructions, when executed by one or more processors, cause the one or more processors to perform operations of the method 500.

At 510, the method 500 includes retrieving a ciphertext associated with encrypted content by a first device (e.g., the first device 110 of FIG. 1). In an embodiment, the ciphertext may include the encrypted seed information (e.g., $PRE_{P.pk}$ (FwK_seed||BwK_seed), and the encrypted content (e.g., $E_K$(content)), a first hash count value i, and a second hash count value j, where the encrypted content has been encrypted using a content key K, where K was generated based on an $i^{th}$ forward hash chain value (FwK) derived by hashing of a forward hash chain i times using h, and based on an $j^{th}$ backward hash chain value (BwK) derived by hashing a backward hash chain j times using h. In an embodiment the first hash count value i and the second hash count value j may correspond to the hash count values provided (e.g., at step 430 of FIG. 4) when the encrypted content was provided from the first device to the second device.

At 520, the method 500 may include retrieving a PRE private key that may be used to decrypt the encrypted seed information. In an embodiment, the PRE private key may correspond to a private key associated with the first device (e.g., the first device 110 of FIG. 1). At 530, the method 500 includes decrypting the PRE ciphertext (e.g., the encrypted seed information) using the PRE private key to obtain the forward seed (FwK_seed) and the backward seed (BwK_seed). At 540, the method 500 includes hashing FwK_seed i times to obtain FwK (e.g., the forward hash chain value used to generate the content key K used to encrypt the encrypted content), and, at 550, the method 500 includes hashing BwK_seed times to obtain BwK (e.g., the backward hash chain value used to generate the content key K used to encrypt the encrypted content). At 560, the method 500 includes generating the content key K based on FwK and BwK. In an embodiment, K may be generated by evaluating K=FwK$\otimes$BwK, where $\otimes$ denotes a bitwise exclusive or (XOR) of FwK and BwK. At 570, the method 500 includes decrypting the encrypted content (e.g., $E_K$(content)) using the content key (K) determined in step 560.

By encrypting the seed information with a public key associated with the first device 110 (e.g., the device that created the seed information) using a PRE technique, the first device may be operable to generate a re-encryption key (rk) that may allow an authorized third party device to decrypt the encrypted seed information, and, therefore, decrypt the encrypted content. Additionally, the first device may retrieve the content and decrypt the content using its private key, as described above. Further, because the ciphertext includes the FwK_seed and the BwK_seed that have been encrypted using PRE, an amount of computational resources required to decrypt multiple pieces of content may be reduced, as described in more detail below. Additional aspects of generating re-encryption keys (rks) for authorizing third party devices to retrieve encrypted content are described with reference to FIGS. 10-13.

Additionally, it is noted that the method 500 may also reduce computational complexity and computational resources consumed when decrypting multiple pieces of content. For example, existing techniques for using PRE require each content key to be encrypted using PRE, which is computationally expensive. For example, assuming that M pieces of content have been encrypted using N content keys ($K_1$, $K_2$, ..., $K_N$), presently used PRE techniques would require computation of <$PRE_{P.pk}(K_1)$, $E_{K1}(M_1)$>, <$PRE_{P.pk}(K_2)$, $E_{K2}(M_2)$>, ..., <$PRE_{P.pk}(K_N)$, $E_{KN}(M_N)$>. Computing each content key K using PRE and then decrypting each piece of content using the computed K values is computationally complex and costly. The computation cost may be reduced by using a single content key to encrypt the multiple pieces of content, however, this strategy is less resilient to brute force attacks or when a device has been compromised.

In contrast to such approaches, in embodiments, multiple pieces of content may be encrypted/decrypted using a single PRE computation. For example, according to embodiments, the multiple pieces of content may be encrypted by computing: $PRE_{P.pk}$(FwK_seed||BwK_seed), $E_{K1}(M_1)$, $E_{K2}(M_2)$, ..., $E_{KN}(M_N)$, which may save N−1 PRE computations required to encrypt N pieces of data. Thus, the method 500 may reduce a computational cost and reduce a computational complexity associated with using PRE techniques while retaining content key resiliency (e.g., while continuing to use multiple content keys). For example, using the encryption/decryption techniques of FIGS. 1-5, the window of vulnerability for obtaining content that has been encrypted may be as small as 1 piece of content (e.g., due to each piece of content being encrypted using a different content key).

Further, the decryption method of FIG. 5 may enable use of PRE techniques without providing FwK_seed to the second device or a third party device requesting access to the encrypted content. For example, the first device may receive a request for particular content and may use PRE to generate a re-encryption key that may be provided to the requesting device for use in decrypting the content. Thus, in embodiments, FwK_seed may not be known to any devices other than first device (e.g., the device that generate FwK_seed) or any devices which can decrypt the ciphertext $PRE_{P.pk}$(FwK_seed||BwK_seed). Additional aspects of generating re-encryption keys (rks) for authorizing third party devices to retrieve encrypted content are described with reference to FIGS. 10-13

Figure 6:
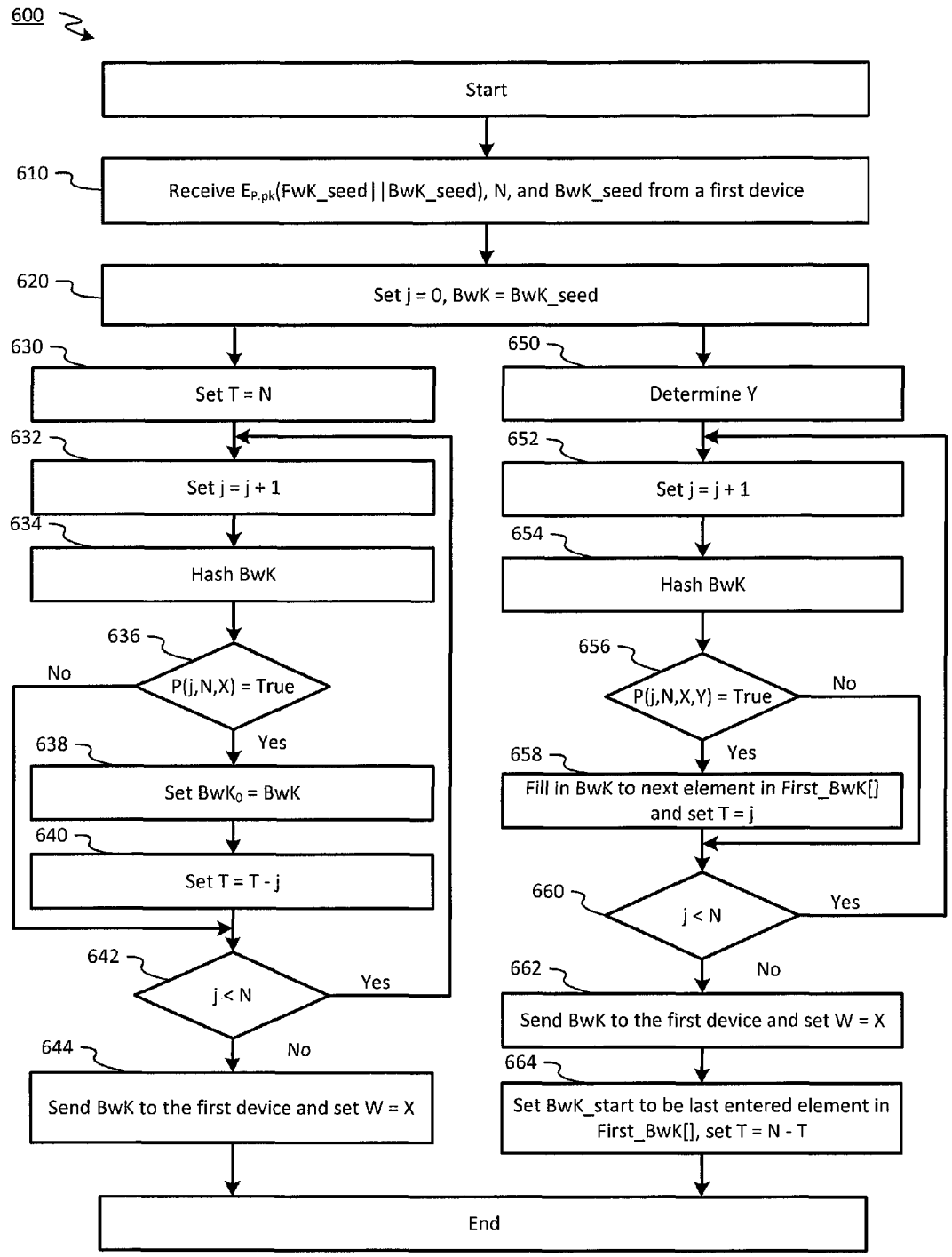
FIG. 6 is a flow chart illustrating exemplary embodiments of methods for initializing a hash chain for use in generating content keys used to encrypt content according to embodiments.

Referring to FIG. 6, a flow chart illustrating exemplary embodiments of methods for initializing a hash chain for use in generating content keys used to encrypt content according to embodiments is shown as a method 600. In an embodiment, the method 600 may be performed by the second device 120 of FIGS. 1 and 10. In an embodiment, the method 600 may be stored as instructions in a memory (e.g., the memory of the second device 120 of FIGS. 1 and 10), where the instructions, when executed by one or more processors, cause the one or more processors to perform operations of the method 600.

At 610, the method 600 includes receiving information from a first device at a second device (e.g., the second device 120 of FIG. 1). In an embodiment, the information may include encrypted seed information ($E_{P.pk}$ (FwK_seed||BwK_seed), a hash chain length N (e.g., N of FIGS. 2 and 3), and a backward hash chain seed (BwK_seed), where P.pk is the public key that corresponds to a private key associated with the first device. The backward hash chain seed may be used to generate a backward hash chain, as described with reference to FIG. 2. The second device may store the information at a memory accessible to the second device. At 620, the method 600 includes initializing a first hash count j and initializing the backward hash chain value BwK to BwK_seed. In an embodiment, a value of j may correspond to a number of times that the backward hash chain has been hashed using a hash function h. In an embodiment, h may be a one-way hash function, as described with reference to FIG. 2.

At 630, the method 600 may include initializing a second hash count T, where T represents a number of times to hash the backward hash chain to derive a next backward hash chain value that may be provided to the first device for generating a content key. At 632, the method 600 includes updating j. In an embodiment, updating j may include incrementing j (e.g., j=j+1), as shown in FIG. 6. It is noted that the variable j in FIG. 6 is different from the variable j of FIG. 4 in that the j of FIG. 4 is used by the first device during the data transfer phase while the j of FIG. 6 is used only during initialization of the second device. In an additional or alternative embodiment, updating j may include decrementing j (e.g., j=j−1). However, it is noted that decrementing j would require slight modification of FIG. 6. Therefore, in FIG. 6, it is assumed that j is incremented, rather than decremented for simplicity of the present disclosure. At 634, the method 600 includes hashing BwK using h. At 636, the method may include determining whether P(j,N,X) is true, where P(j,N,X) corresponds to j=(N−L). In response to determining that P(j,N,X) is true, the method 600 may include, at 638, setting $BwK_0$ to BwK (e.g., the backward hash chain value derived by hashing BwK in step 634), and, at 640, updating T. In an embodiment, T may be updated according to T=T−j. At 642, the method 600 includes determining whether j<N. In response to a determination that j<N, the method 600 may iterate back to step 632. In response to a determination that j>N or j=N, the method 600 may include, at 644, sending BwK to the first device (e.g., the first device 110 of FIG. 1), and initializing a countdown W, where W may be used to count a number of pieces of content received from the first device. In an embodiment, W may be initialized to X (e.g., the update period), such that the update countdown W may be used to determine whether X pieces of content have been received from the first device. For example, when W=0, the second device may determine that X pieces of content have been received from the first device, which may signal the second device to generate a new backward hash chain value, as described with reference to FIG. 7.

It is to be appreciated that the method 600 may be used to initialize the backward hash chain to an initial backward hash chain value ($BwK_0$) by hashing BwK_seed N−L times and to send $BwK_L$ (which is obtained by hashing BwK_seed N times) to the first device. For example, assume that N=6 and X=2. Therefore, L=3 (e.g., L=N/X=6/2=3) and N−L=3. Applying these values to the method 600, at step 620, j is set to zero and the current backward hash chain value BwK is set to BwK_seed, and at step 630, T is set to N (e.g., T=6). At step 632, j is increment by 1 (e.g., j=1), and, at step 634, BwK (e.g., BwK_seed) is hashed using the hash function h. At step 636, it is determined whether j=(N−L). During this first iteration, j=1 and (N−L)=3, therefore step 636 results in a determination that P(j,N,X) is false. Hence, $BwK_0$ is not set to BwK (e.g., the backward hash chain value derived by performing one hash of BwK_seed using h) in the first iteration. At step 642, it is determined whether j<N, which, during this first iteration, is true (e.g., 1<6), and a second iteration is performed starting at step 632. During the second iteration, j=2, BwK is hashed using h (that is, during the second iteration, BwK is the result of hashing BwK_seed two times), and P(j,N,X) evaluates to false (e.g., j is smaller than (N−L) since j=2, (N−L)=3), at steps 632-636 respectively. Thus, during the second iteration, at step 638, $BwK_0$ is not set to BwK (e.g., the backward hash chain value derived by performing a second hash of BwK_seed using h) during the second iteration. At step 642, j<N (e.g., 2<6), therefore, a third iteration may be performed starting at step 632.

During the third iteration, j=3, BwK is hashed using h, and is equal to the result of hashing BwK_seed three times. At step 636, P(j,N,X) evaluates to true since. j=(N−L) (e.g., j=3, (N−L)=6−3=3), and, at 638, $BwK_0$ is set to BwK, which is the result of hashing BwK_seed (N−L) (e.g., 6−3=3) times. At 640, T is set to T−j (that is, T−j=6−3=3). At 642, j<N evaluates to true and the fourth iteration may be performed starting at step 632. The iterations continue until j=N, and BwK is equal to hashing BwK_seed N times.

In the subsequent iterations (e.g., the iterations that follow the third iteration) j>(N−L) (e.g., j=4, 5, . . . >3). Therefore, P(j,N,X) evaluates to false since j>(N−L); hence, $BwK_0$ and T will be left unmodified between the (N−L+1)-th and N-th iteration. At the N-th iteration, which is the sixth iteration in this example, j=N (e.g., j=6 and N=6). Therefore, j<N evaluates to false, at 642, and, as a result, the iterations terminate with sending BwK, which is equal to hashing BwK_seed N times (e.g., 6 times), to the first device. Yet, $BwK_0$ and T remain equal to the result of hashing BwK_seed (N−L) times and L respectively (e.g., $BwK_0$ remains equal to the result of hashing BwK_seed three times and T=3). In an alternative embodiment, evaluating P(j,N,X) at step 636 could be set as evaluating the predicate j≤(N−L), but the step 640 would need to be modified to "Set T=T−1", instead of "Set T=T−j".

It is to be appreciated, that from the description above, it can be seen that the method 600 initializes a backward hash chain to an initial backward hash chain value $BwK_0$ and determines a first backward hash chain value BwK (e.g., the backward hash chain value derived by performing a sixth hash of BwK_seed using h during the sixth iteration) for transmission to the first device for generating a first content key (e.g., content key $K_1$ of FIG. 2). Additionally, it has been shown that the method 600 generates the initial backward hash chain value $BwK_0$ by hashing BwK_seed N−L times (e.g., N−L=6−3) corresponding to the first through third iterations described above, and generates the first backward hash chain value BwK (e.g., $BwK_L$ of FIG. 2) by hashing $BwK_0$ L times (e.g., L=3) corresponding to the fourth through sixth iterations described above. As described with reference to FIG. 2, the first device may use the backward hash chain value BwK (e.g., $BwK_L$ of FIG. 2) received from the second device and a forward hash chain value (e.g., $FwK_1$ of FIG. 2) generated by the first device to generate a first content key (e.g., $K_1$ of FIG. 2).

In an additional or alternative embodiment, in response to initializing j and setting BwK to BwK_seed, at step 620, the method 600 may include, at 650, determining a hash table parameter Y, where Y corresponds to a number of intermediate backward hash chain values that are between two pre-computed backward hash chain values (e.g., milestone backward hash chain values, as described with reference to FIG. 2). Thus, the pre-computed backward hash chain values may be used to generate a hash table (e.g., the table 230 of FIG. 2), where the hash table may be used to periodically derive BwK values for transmission to the first device, as described in more detail below. At 620, the method 600 may include initializing a first hash count j and initializing the backward hash chain value BwK to BwK_seed, where j corresponds to the first hash count described with reference to step 620, and represents a number of times that the backward hash chain has been hashed using a hash function h. At 652, the method 600 includes updating the hash count j. At 654, the method 600 includes hashing BwK using h.

At 656, the method 600 includes determining whether P(j,N,X,Y) is true, where P(j,N,X,Y) corresponds to whether a current backward hash chain value BwK is a milestone backward hash chain value. Thus, when P(j,N,X,Y) is true, the current BwK should be stored in the hash table (noted as First_BwK[ ] in the FIGs.), and when P(j,N,X,Y) is false, the current BwK is an intermediate backward hash chain value and is not stored in the hash table. In response to a determination, at 656, that the current BwK is a milestone backward hash chain value, the method 600 may include, at 658, filling in a next table entry of the hash table (First_BwK[ ]) with the current value of BwK (e.g., the BwK determined at 654). In an embodiment, a first milestone backward hash chain value may correspond to $BwK_0$, as described with reference to steps 632-644 above, and additional milestone backward hash chain values may be identified every Y iterations (e.g., P(j,N, X,Y) may evaluate true for $BwK_0$, $BwK_{0+Y}$, $BwK_{0+2Y}$, and so on until BwK_seed has been hashed N times). In response to a determination, at 656, that the current BwK is not a milestone backward hash chain value (e.g., the current BwK is an intermediate backward hash chain value), the method 600 may proceed to 660 without writing the current BwK into the hash table.

At 660, the method 600 may include determining whether j<N is true. The determination, at 660, of whether j<N is true may be used to iterate steps 652 through 660 in a manner similar to iterating steps 632-642, as described above. In an embodiment, when j<N is false, the hash table may include a plurality of milestone backward hash chain values BwK. In an embodiment, the hash table may be a last in first out hash table, where a last entry of the hash table is a first entry used to derive the first backward hash chain value BwK that is sent to the first device. Thus, the last entry in the hash table may not be $BwK_L$ but a next closest BwK, such as $BwK_{L-1}$ or $BwK_{L-2}$, depending on the values of N and Y. At 662, the method includes initializing an update countdown W based on an update period X, and sending the first backward hash chain value BwK to the first device, where the update countdown W corresponds to the update countdown W described with reference to step 644. In an embodiment, X may be a value received from the first device. In an additional or alternative embodiment, X may be derived or generated by the second device. At 664, a backward hash chain starting value (BwK_start) is set to the last entry of the hash table First_BwK[ ], and T is set to N–T. This updated value of T corresponds to the number of times to hash the BwK_start set at 664 to obtain the first backward hash chain value BwK sent to the first device at 662.

As an illustrative example, in an embodiment, denoting that L=N/X, P(j,N,X,Y) may be the predicate: (N–L)≤j<N AND (j–(N–L))mod Y=0, where mod denotes modular arithmetic, assume that N=6, X=2, and Y=2. Therefore, L=N/X=3, and (N–L)=6–3=3. The milestone backward hash chain values would be set to BwK when j=3, 5, that is, hashing BwK_seed three and five times respectively. During a first iteration, j=1 at 652, BwK is hashed from BwK_seed, at 656, P(j,N, X, Y) evaluates to false since j<(N–L) (e.g., j=1, (N–L)=3), and step 658 may be skipped. At 660, j<N evaluates to true (e.g., j=1, N=6), and a second iteration may be performed starting at step 652. This continues until the third iteration, during which, j=3 and BwK is equal to hashing BwK_seed three times. At step 656, P(j,N,X,Y) evaluates to true since j≥(N–L) and (j–(N–L))mod Y=0 (e.g., j=3, (N–L)=3, Y=2; 3≥3, (3–3) mod 2=0). Therefore, BwK (which is equal to hashing BwK_seed three times) is stored in First_BwK[ ] and T is set to j, which is 3. At 660, j<N evaluates to true and the fourth iteration may be performed. During the fourth iteration, j=4, P(j,N,X,Y) evaluates to false because, although j≥(N–L) (e.g., j=4, (N–L)=3; 4≥3), (j–(N–L))mod Y=1 (e.g., j=4, (N–L)=3, Y=2; (4–3)mod 2=1≠0); therefore, step 658 may be skipped during the fourth iteration. At 660, j<N evaluates to true and the fifth iteration is performed. During the fifth iteration, P(j,N,X,Y) evaluates to true because j≥(N–L) and (j–(N–L))mod Y=0 (e.g., j=5, (N–L)=3, Y=2; 5≥3 and (5–3) mod 2=2 mod 2=0). Therefore, during the fifth iteration, BwK is stored as a milestone backward hash chain value in First_BwK[ ] and T is set to j, which is 5. At step 660, j<N evaluates to true and a sixth iteration may be performed. During the sixth iteration, P(j,N,X,Y) evaluates to false because, although j≥(N–L), j is not smaller than N and (j–(N–L))mod Y=1≠0. Therefore, BwK is not stored as a milestone backward hash value in First_BwK[ ] during the sixth iteration. T remains unmodified and equal to 5 (e.g., the number of times to hash BwK_seed to obtain the last entry in the hash table First_BwK[ ]). Thus, it can be seen that BwK is stored as a milestone backward hash value in First_BwK[ ] during the third and fifth iterations only, and these values correspond to $BwK_0$, $BwK_2$ obtained from hashing BwK_seed (N–L) times and (N–L)+Y times respectively. During the sixth iteration, at 600, j<N evaluates to false (e.g., j=6, N=6), and the iterations terminate. At 662, BwK, which is the same as $BwK_L$ (e.g., L=3) or hashing BwK_seed N (e.g., N=6) times, is sent to the first device. At 664, BwK_start is set to the last entered entry in First_BwK[ ], which is $BwK_2$ (obtained by hashing BwK_seed 5 times), and T is set to N–T (e.g., 6–5=1).

Thus, the method 600 provides techniques for initializing a backward hash chain value, and for determining a backward hash chain value to provide to a first device for use in generating a content key for encrypting content. Additionally, the method 600 provides techniques for pre-computing milestone backward hash chain values and generating a hash table based on the pre-computed milestone backward hash chain values. Generating the hash table of pre-computed milestone backward hash chain values may reduce an amount of computational resources that are required to determine a next backward hash chain value to send to the first device, as explained in more detail below. Additionally, using the hash table generated by the method 600 may reduce an amount of time required to determine a next backward hash chain value to send to the first device, as explained in more detail below, thereby freeing up computational resources of the second device for processing other information, such as requests for content and/or generating backward hash chain values for other devices.

Figure 7:
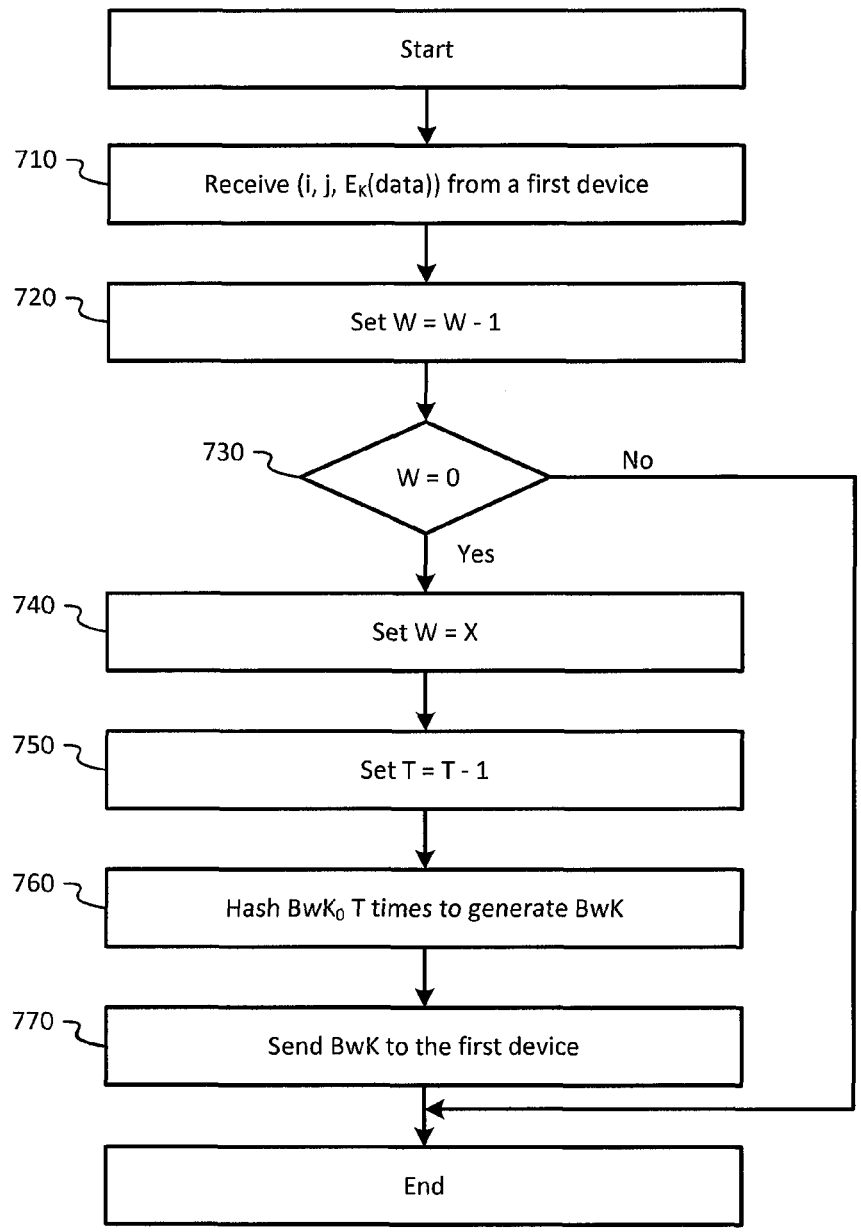
FIG. 7 is a flow chart illustrating an embodiment of a method for updating a backward hash chain value.

Referring to FIG. 7, a flow chart illustrating an embodiment of a method for updating a backward hash chain value is shown as a method 700. In an embodiment, the method 700 may be performed by the second device 120 of FIGS. 1 and 10 in response to receiving encrypted content from a first device (e.g., the first device 110 of FIGS. 1 and 10). In an embodiment, the method 700 may be stored as instructions in a memory (e.g., the memory of the second device 120 of FIGS. 1 and 10), where the instructions, when executed by one or more processors, cause the one or more processors to perform operations of the method 700.

At 710, the method 700 includes receiving a message including encrypted content ($E_K$(content)) from a first device, where the content has been encrypted using a content key K derived from a forward hash chain value and a backward hash chain value, as described above. In an embodiment, the message may include a first hash count value i, and a second hash count value j, where i and j correspond to the first and second hash counts described with reference to FIGS. 3-5. At 720, the method 700 includes updating an update countdown W, where W corresponds to the update countdown W described with reference to FIG. 6. In an embodiment, updating W may include decrementing W (e.g., W=W–1). At 730, the method 700 includes determining whether W=0. In response to a determination that W≠0, the method 700 may end (i.e., because the current backward hash chain value BwK has not changed).

In response to a determination, at 730, that W=0, the method 700 may include, at 740, setting W to the update period X, and, at 750, updating the value of T, where T corresponds to the number of times to hash $BwK_0$ to derive a next backward hash chain value BwK. In an embodiment, updating the value of T may include decrementing T (e.g., T=T–1). In an additional or alternative embodiment, updating T may include incrementing T (e.g., T=T+1), although such an embodiment may require slight modification of FIG. 7, as will be apparent to one of ordinary skill. At 760, the method 700 includes hashing $BwK_0$ T times to generate a new current backward hash chain value BwK. In an embodiment, assuming that a previous backward hash chain value BwK that was sent to the first device was $BwK_L$, the new current backward hash chain value BwK may be a backward hash chain value $BwK_{L-1}$. At 770, the method 700 includes sending the new current BwK to the first device, where the new current BwK may be used by the first device to generate a content key for encrypting content.

As shown in FIG. 7, in response to a determination that W>0, no operations may be performed with respect to BwK and/or $BwK_0$. This occurs because, when W>0, the update countdown has not been reached (i.e., X pieces of content have not been received from the first device), and therefore, no hashing of BwK or $BwK_0$ is required, as described above with respect to FIG. 2. It is noted that the method 700 provides a technique for deriving backward hash chain values independent of the generation of forward hash chain values, and without knowledge of forward hash chain seed and/or the current forward hash chain values. Additionally, it is noted that the method 700 may be utilized when a hash table (e.g., the hash table described with reference to FIG. 6) of pre-computed backward hash chain values is not generated. Aspects of embodiments for generating new current backward hash chain values using a hash table are described below.

Figure 8:
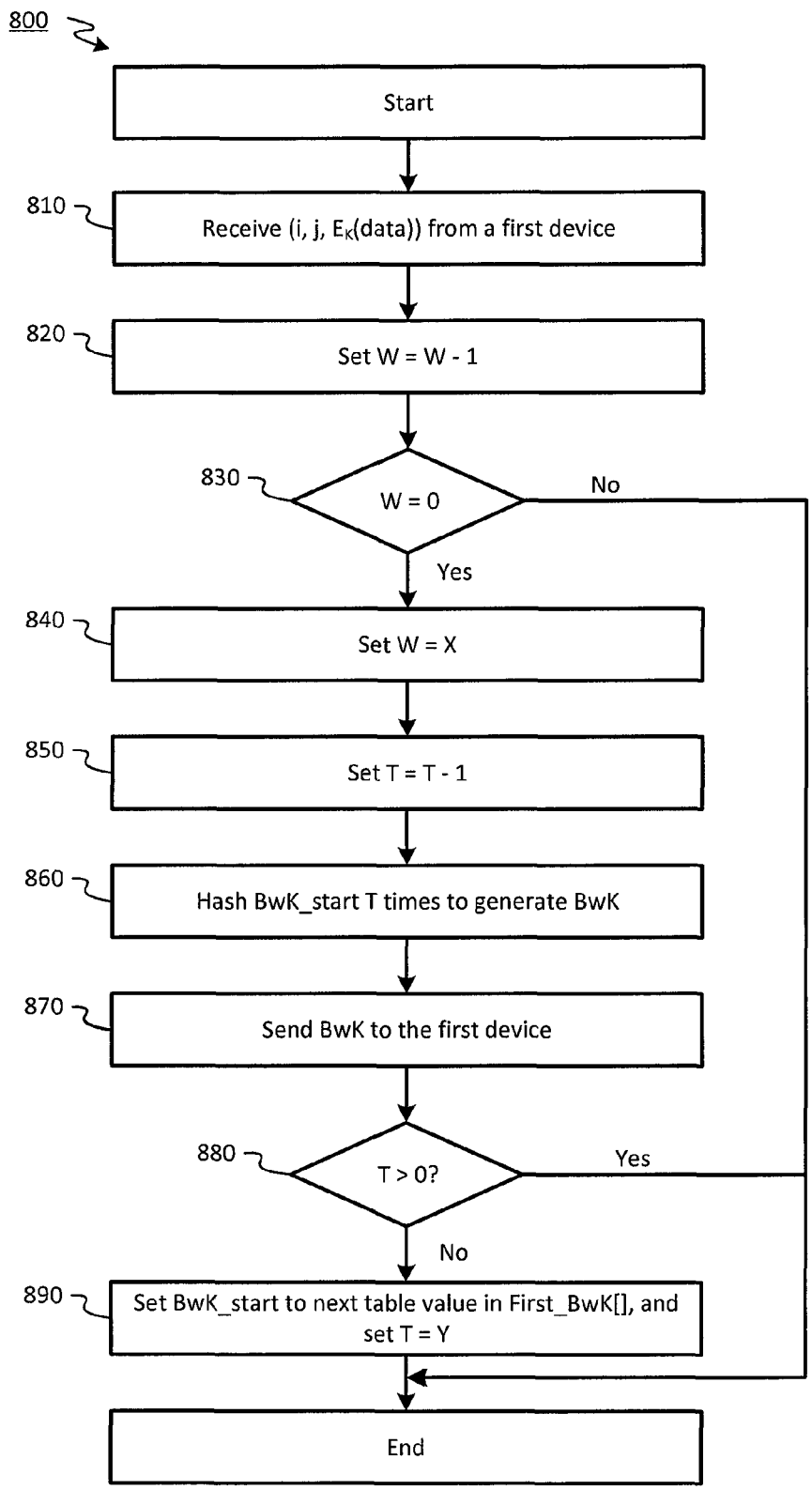
FIG. 8 is a flowchart illustrating an embodiment of a method for updating a backward hash chain value using pre-computed backward hash chain values.

Referring to FIG. 8, a flowchart illustrating an embodiment of a method for updating a backward hash chain value using pre-computed backward hash chain values is shown as a method 800. In an embodiment, the method 800 may be performed by the second device 120 of FIGS. 1 and 10 in response to receiving encrypted content from a first device (e.g., the first device 110 of FIGS. 1 and 10). In an embodiment, the method 800 may be stored as instructions in a memory (e.g., the memory of the second device 120 of FIGS. 1 and 10), where the instructions, when executed by one or more processors, cause the one or more processors to perform operations of the method 800.

At 810, the method 800 includes receiving a message including encrypted content ($E_K$(content)) from a first device, where the content has been encrypted using a content key K derived from a forward hash chain value and a backward hash chain value, as described above. In an embodiment, the message may include a first hash count value i, and a second hash count value j, where i and j correspond to the first and second hash counts described with reference to FIGS. 3-5. At 820, the method 800 includes updating an update countdown W, where W corresponds to the update countdown W described with reference to FIG. 6. In an embodiment, updating W may include decrementing W (e.g., W=W−1). At 830, the method 800 includes determining whether W=0. In response to a determination that W≠0, the method 800 may end (i.e., because the current backward hash chain value BwK has not changed).

In response to a determination, at 830, that W=0, the method 800 may include, at 840, setting W to the update period X, and, at 850, updating the value of T, where T corresponds to the number of times to hash BwK_start to derive a next backward hash chain value BwK. It is noted that, in step 664 of FIG. 6, T was initialized to the number of times to hash the first BwK_start (corresponding to the last entry in the hash table First_BwK[ ]) to obtain the first backward hash chain value $BwK=BwK_L$, as described with reference to FIG. 6. In an embodiment, updating the value of T may include decrementing T (e.g., T=T−1). In an additional or alternative embodiment, updating T may include incrementing T (e.g., T=T+1), although such an embodiment may require slight modification of FIG. 8, as will be apparent to one of ordinary skill. At 860, the method 800 includes hashing BwK_start T times to generate a new current backward hash chain value BwK, where BwK_start initially corresponds to the last entry in a table of pre-computed milestone backward hash chain values, as described with reference to FIG. 6. It is noted that BwK_start may be subsequently updated to earlier milestone backward hash chain values in First_BwK[ ], as step 890 is invoked during subsequent operations of the method 800. In an embodiment, assuming that a previous backward hash chain value BwK that was sent to the first device was $BwK_L$, the new current backward hash chain value BwK generated at 860 may be a backward hash chain value $BwK_{L-1}$. At 870, the method 800 includes sending the new current BwK to the first device, where the new current BwK may be used by the first device to generate a content key for encrypting content.

At 880, the method 800 includes determining whether T>0. In response to a determination that T≤0, the method 800 includes, at 890, setting BwK_start to a next pre-computed milestone backward hash chain value, and updating the value of T based on Y, where Y corresponds to a number of intermediate backward hash chain values that are between two pre-computed backward hash chain values stored in First_BwK[ ], and T functions as the countdown for updating BwK_start to subsequent pre-computed milestone backward hash chain values stored in First_BwK[ ], and indicates the number of times to hash the current BwK_start to obtain the backward hash chain value BwK for computing the content key $K_i$. A BwK value can be obtained by hashing the nearest pre-computed milestone backward hash values in First_BwK[ ], where BwK_start denotes this nearest pre-computed milestone hash value for computing the next BwK, and T is the number of times to hash BwK_start to obtain the next BwK. As BwK values are subsequently updated, T is decremented to reflect that a fewer number of times of hashing are necessary to compute the next BwK from the current BwK_start. After Y BwK values have been computed from a particular BwK_start, this BwK_start is no longer the nearest pre-computed milestone backward hash chain value for computing the next values of BwK (e.g., because T is set to Y after each BwK_start update). Further, it can be seen that an update of BwK_start may be signaled when T has been decremented to 0 (e.g., T=0 at step 890). Consequently, the next BwK_start value will be updated by reading from First_BwK[ ] and the countdown T for BwK_start update is reset to Y, which is the number of hash values between two adjacent pre-computed milestone backward hash values in First_BwK[ ].

For example, as explained above with respect to FIG. 6, BwK_start is initialized to a last pre-computed milestone backward hash chain value (e.g., the last pre-computed milestone backward hash value determined during creation of the table (e.g., the table 230 of FIG. 2) in step 664 of FIG. 6. Further, in step 664 of FIG. 6, the countdown T is set to the number of times to hash the last entry of First_BwK[ ] (which is used to set the first BwK_start) to obtain the first BwK. This is the only exception that T is not initiated to Y (e.g., the number of backward chain hash values between two entries of First_BwK[ ]). For all subsequent updates to BwK_start, the countdown T is reset to Y. As BwK is updated and sent to the first device (e.g., at steps 860 and 870 of FIG. 8), T is counted down, and when T reaches 0, the second to last pre-computed milestone backward hash value is used to update BwK_start, and T is reset to count down from Y, as indicated at step 890.

When T reaches 0 again, the third to last pre-computed milestone backward hash chain value is used to update BwK_start, and T is reset to count down from Y again.

Additionally, as explained with reference to FIG. 6, the table (e.g., First_BwK[ ]) may be a last in first out table, where the last entry in the table is the first pre-computed milestone backward hash chain value used to compute intermediate backward hash chain values, a next to last entry in the table is the second pre-computed milestone backward hash chain value used to compute intermediate backward hash chain values, and so on. Thus, if the last pre-computed milestone backward hash chain value used to compute an intermediate backward hash chain value corresponds to an entry of the table having an index of z, at 890, BwK_start may be set to a pre-computed milestone backward hash chain value associated with an entry of the table having an index z−1.

As shown in FIG. 8, in response to a determination that T>0, no operations may be performed with respect to BwK_start and/or T. This occurs because, when T>0, additional intermediate backward hash chain values may be generated using the current BwK_start, and therefore, no update to BwK_start is required. It is noted that the method 800 provides a technique for deriving backward hash chain values independent of the generation of forward hash chain values, and without knowledge of forward hash chain seed and/or the current forward hash chain values. Additionally, it is noted that the method 800 may be utilized when a hash table (e.g., the hash table described with reference to FIG. 6) of pre-computed backward hash chain values is generated. Further, it is noted that when T=0 (e.g., when a result of updating T at 850 causes T=0), the BwK_start may be the next backward hash chain value to be sent to the first device, and therefore, at 860, BwK_start may not be hashed, and BwK may set to BwK_start and sent to the first device.

It is to be appreciated that the method 800 may reduce the computational complexity and the amount of computations required to determine backward hash chain values for use in generating content keys for encrypting and decrypting content. For example, using the method 800, BwK_start may be hashed at most Y times. Additionally, when the next BwK value corresponds to one of the pre-computed milestone backward hash chain values, no hashing of BwK_start is necessary, as described above. Thus, the method 800 provides an improved technique for generating backward hash chain values for use in an encryption scheme that utilizes dual hash chains according to embodiments.

Figure 9:
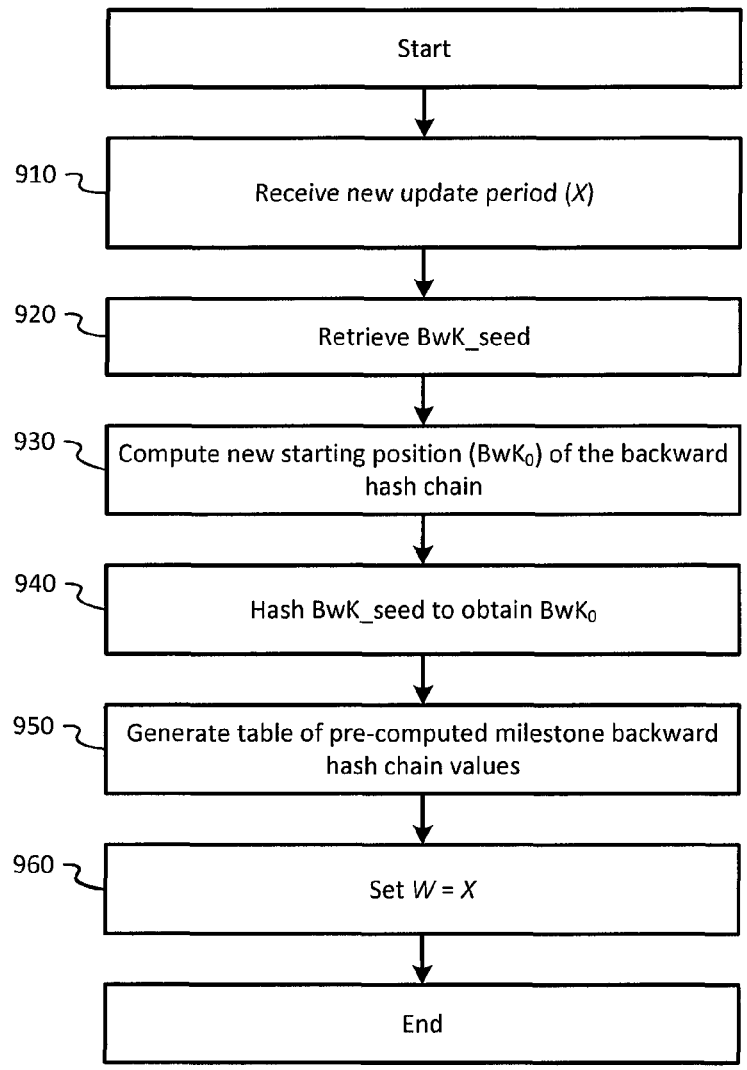
FIG. 9 is a flow chart of an illustrative embodiment of a method for updating an update period for generating backward hash chain values.

Referring to FIG. 9, a flow chart of an illustrative embodiment of a method for updating an update period for generating backward hash chain values is shown as a method 900. In an embodiment, the method 900 may be performed by the second device 120 of FIGS. 1 and 10 in response to receiving encrypted content from a first device (e.g., the first device 110 of FIGS. 1 and 10). In an embodiment, the method 900 may be stored as instructions in a memory (e.g., the memory of the second device 120 of FIGS. 1 and 10), where the instructions, when executed by one or more processors, cause the one or more processors to perform operations of the method 900.

At 910, the method 900 includes receiving information associated with a new update period (e.g., a new value of X). It is noted that changing the update period may allow for generating more or fewer backward hash chain values. For example, as explained with reference to FIG. 2, L backward hash chain values may be generated and used to generate N content keys, where the N content keys are generated using the L backward hash chain values and N forward hash chain values, and where L=N/X. Thus, as X increases, L may decrease, thereby decreasing the number of backward hash chain values that may be generated, and as X decreases, L may increase, thereby increasing the number of backward hash chain values that may be generated. It is noted that the number of backward hash chain values generated may not dictate the number of content keys that may be generated, but as L increases, more content keys may be generated using the same backward hash chain value.

At 920, the method 900 includes retrieving the backward hash chain seed BwK_seed (e.g., the backward hash chain seed received at 132 of FIG. 1, or at 610 of FIG. 6). At 930, the method 900 includes computing a new starting position of the backward hash chain, where the starting position of the backward hash chain corresponds to $BwK_0$. In an embodiment, computing the starting position of the backward hash chain may include evaluating N−L hash values, where L=N/X. At 940, the method 900 includes hashing BwK_seed to obtain $BwK_0$. In an embodiment, BwK_seed may be hashed N−L times to obtain $BwK_0$, as described above. At 950, the method 900 includes generating a table of pre-computed milestone backward hash chain values. In an embodiment, the table of pre-computed milestone backward hash chain values may be generated as described with reference to FIG. 6. At 960, the update countdown W may be set to the new update period X received at 910. Thus, during subsequent operations according to FIG. 8, the update period X received at 910 may be used to determine whether to generate a new BwK (e.g., a new backward hash chain value) for transmission to the first device. It is noted that when a table of pre-computed backward hash chain values is not to be used, step 950 may be omitted, and subsequent operations may proceed using the update period X received at 910 according to FIG. 7.

Thus, the method 900 provides a technique for modifying an update period used for generating new backward hash chain values. It is noted that changing the frequency (e.g., the update period X) at which new backward hash chain values are provided to the first device may reduce a likelihood that a same content key is used for multiple pieces of content. For example, two sets of backward hash chain values generated at a first frequency and a second frequency, respectively, may generate different sets of content keys even if the forward hash chain values used to generate each of the content keys are the same (e.g., because a same forward hash chain value and different backward hash chain values may generate different content keys). Thus, periodically changing the frequency at which the content keys are generated may provide for a more robust technique for generating content keys for use in encrypting and decrypting content.

Figure 10:
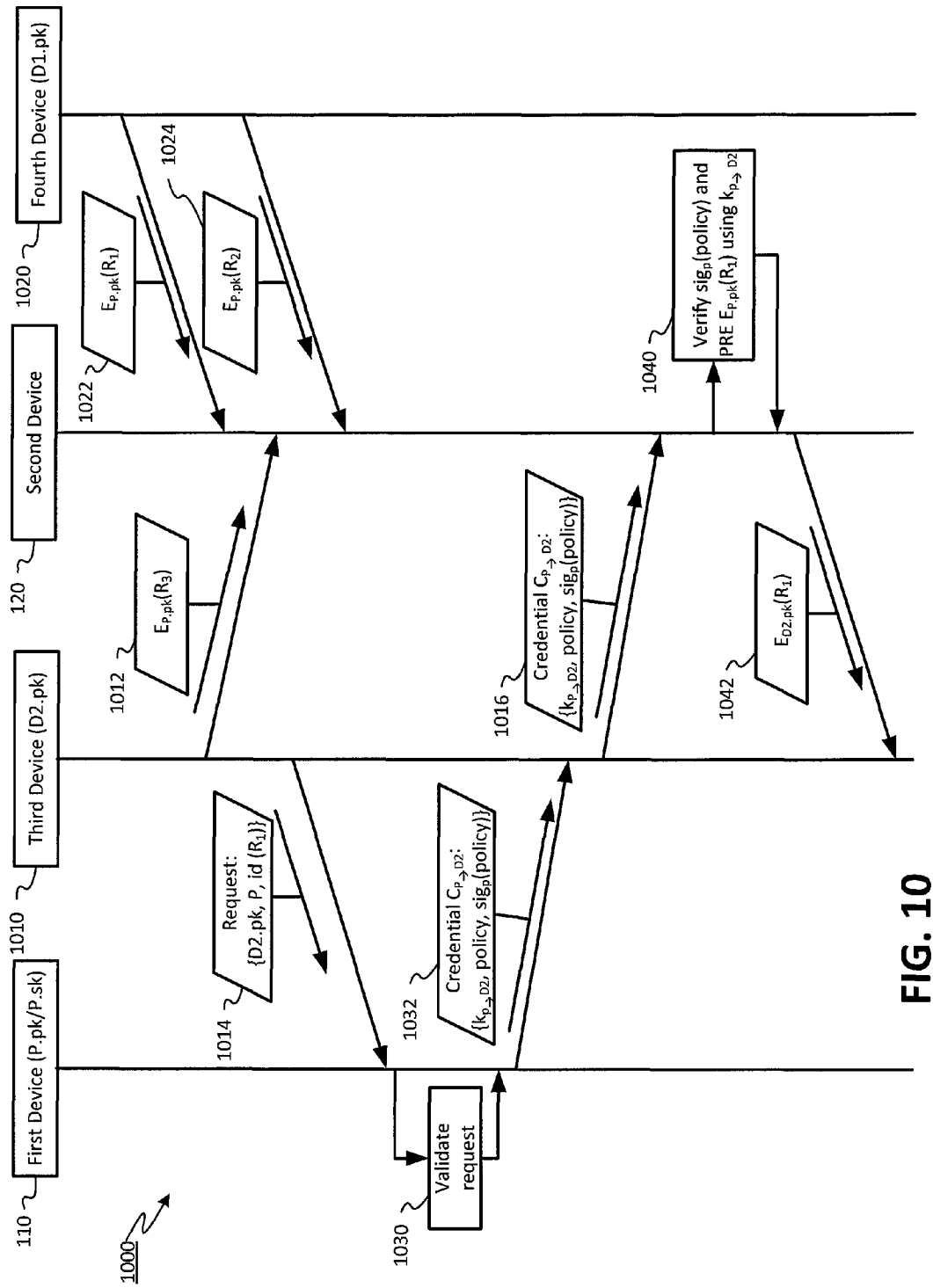
FIG. 10 is a ladder diagram illustrating an embodiment of a system for sharing content that has been encrypted according to embodiments.

Referring to FIG. 10, a ladder diagram illustrating an embodiment of a system for sharing content that has been encrypted according to embodiments is shown, as a system 1000. As shown in FIG. 10, the system 1000 includes the first device 110 and the second device 120 of FIG. 1. Additionally, as shown in FIG. 10, in the system 1000, the first device 110 and the second device 120 may be in communication (e.g., via a network) with a third device 1010 and a fourth device 1020.

During operation of the system 1000 according to embodiments, the third device 1010 and the fourth device 1020 may generate encrypted content using a public key associated with the first device 110, and may store the encrypted content at the second device 120. In an embodiment, the first device 110 may be associated with a patient, the second device 120 may be a server that stores personal health records (PHRs), and the third device 1010 and the fourth device 1020 may be associated with healthcare service providers (e.g., doctors, laboratories, clinics, etc.) that may generate and store the PHRs associated with the patient at the second device 110. To illustrate, at 1012, the third device 1010 may encrypt a PHR ($R_3$)

using a public key (P.pk) associated with the patient to produce an encrypted PHR ($E_{P.pk}(R_3)$), and may store the encrypted PHR at the second device 120.

In an embodiment, the third device 1010 and the fourth device 1020 may generate multiple encrypted PHRs using P.pk. For example, at 1022, the fourth device 1020 may encrypt a PHR ($R_1$) using a public key (P.pk) associated with the patient to produce an encrypted PHR ($E_{P.pk}(R_1)$), and may store the encrypted PHR at the second device 120. Additionally, at 1024, the fourth device 1020 may encrypt a PHR ($R_2$) using the public key (P.pk) associated with the patient to produce an encrypted PHR ($E_{P.pk}(R_2)$), and may store the encrypted PHR at the second device 120.

An operator of the third device 1010 may desire to access one of the encrypted PHRs generated by the fourth device 1020. For example, the operator of the third device 1010 may be associated with a first health care service provider (e.g., a doctor), and an operator of the fourth device 1020 may be associated with a second health care service provider (e.g., a lab facility). Thus, the encrypted PHRs generated and stored (e.g., at 1022 and 1024) at the second device 120 may be associated with results of various lab tests performed by the second health care provider, and the first health care provider may desire to access the results of the lab tests. To access the results of one or more of the lab tests (e.g., $E_{P.pk}(R_1)$ and/or $E_{P.pk}(R_2)$), the third device 1010 may generate, at 1014, a request. In an embodiment, the request may include a public key (D2.pk) associated with the third device 1010, an identity of the patient (P) (e.g., the patient associated with the first device 110), and one or more identifiers associated with the encrypted PHRs that the third device 1010 desires to access. It is noted that, because the encrypted PHRs have been encrypted with the public key (P.pk) associated with the first device 110, the encrypted PHRs may only be decrypted using a private key (P.sk) associated with the first device 110.

At 1030, the first device 110 may receive the request from the third device 1010, and may validate the request. In an embodiment, validating the request may include validating an identity of the requesting device (e.g., validating the identity of the third device 1010). In an additional or alternative embodiment, validating the request may include determining whether to accept the request (i.e., determining whether to grant the third device 1010 with access to the encrypted PHRs identified in the request). Additional aspects of validating a request are described with reference to FIG. 12.

In response to validating the request, the first device 110 may, at 1032, generate a credential $C_{P \to D2}$ and send the credential to the third device 1010. In an embodiment, the credential may include a re-encryption key ($k_{P \to D2}$) that may be used by the second or third device to re-encrypt the requested content, such that the PHRs encrypted with the patient's public key (P.pk) may be decrypted using a private key (D2.sk) associated with the third device 1010. In an embodiment, the re-encryption key may be generated using proxy re-encryption (PRE). In an additional or alternative embodiment, the credential may include a policy. The policy may identify the requester (e.g., the third device 1010), the party granting access (e.g., the patient associated with the first device 110), and a list of encrypted content that the third device 1010 is authorized to access. For example, the third device 1010 may request access to both $E_{P.pk}(R_1)$ and/or $E_{P.pk}(R_2)$, and the list of encrypted content included in the policy may indicate whether the third device 1010 has been granted access to $E_{P.pk}(R_1)$ only, $E_{P.pk}(R_2)$ only, or both $E_{P.pk}(R_1)$ and $E_{P.pk}(R_2)$. Additionally, the policy may include one or more conditions, such as an amount of time (e.g., a day, a week, a month, etc.) during which the third device 1010 may access the identified encrypted content. Further, the credential may include a digitally signed copy of the policy ($sig_p$(policy)). In an embodiment, digitally signing the policy may include encrypting the policy using P.sk.

At 1016, the third device 1010 may receive the credential from the first device 110 and may present the credential to the second device 120. At 1040, the second device 120 may verify the information included in the credential to determine whether to provide the requested content to the third device 1010. In an embodiment, verifying the information may include verifying the digitally signed policy ($sig_p$(policy)), where the second device 120 may verify $sig_p$(policy) using P.pk. In response to verifying $sig_p$(policy), the second device 120 may determine whether the content identified in the policy (e.g., the content that the third device 1010 has been authorized to access) is stored at the second device 120. If the content identified in the policy is stored at the second device 120, the second device 120 may perform proxy re-encryption of the content using $k_{P \to D2}$ to produce PRE content $E_{D2.pk}$(content), and, at 1042, the second device 120 may provide $E_{D2.pk}$(content) to the third device 1010. The third device 1010 may then decrypt $E_{D2.pk}$(content) using a private key (D2.sk) associated with the third device 1010.

The system 1000 may provide an improved techniques for performing proxy re-encryption (PRE). For example, while PRE allows granting access to data without actually having to first obtain a copy of the data, and without performing the re-encryption of the data, it does not support fine-grained access to the data. In contrast, as explained above, by digitally signing the policy, all access rights to the patient's data are separated from the data. Using the digitally signed policy in conjunction with the PRE techniques of embodiments may provide a fine-grained method of granting access to content, which is in contrast to presently available PRE techniques that, through the re-encryption key, can either grant all or nothing access to a requester or requesting device. For example, by identifying the content for which access has been granted, and by specifying the conditions of the access, the party granting access to the content may selectively grant access to a portion of the content while prohibiting or denying access to another portion of the content. Presently available PRE techniques are only operable to provide access to all content or none of the content. Thus, it can be seen that the system 1000 provides an improvement to using PRE techniques for providing access to content. Additional aspects of embodiments for granting access to encrypted content are described below with reference to FIGS. 11-13.

Figure 11:
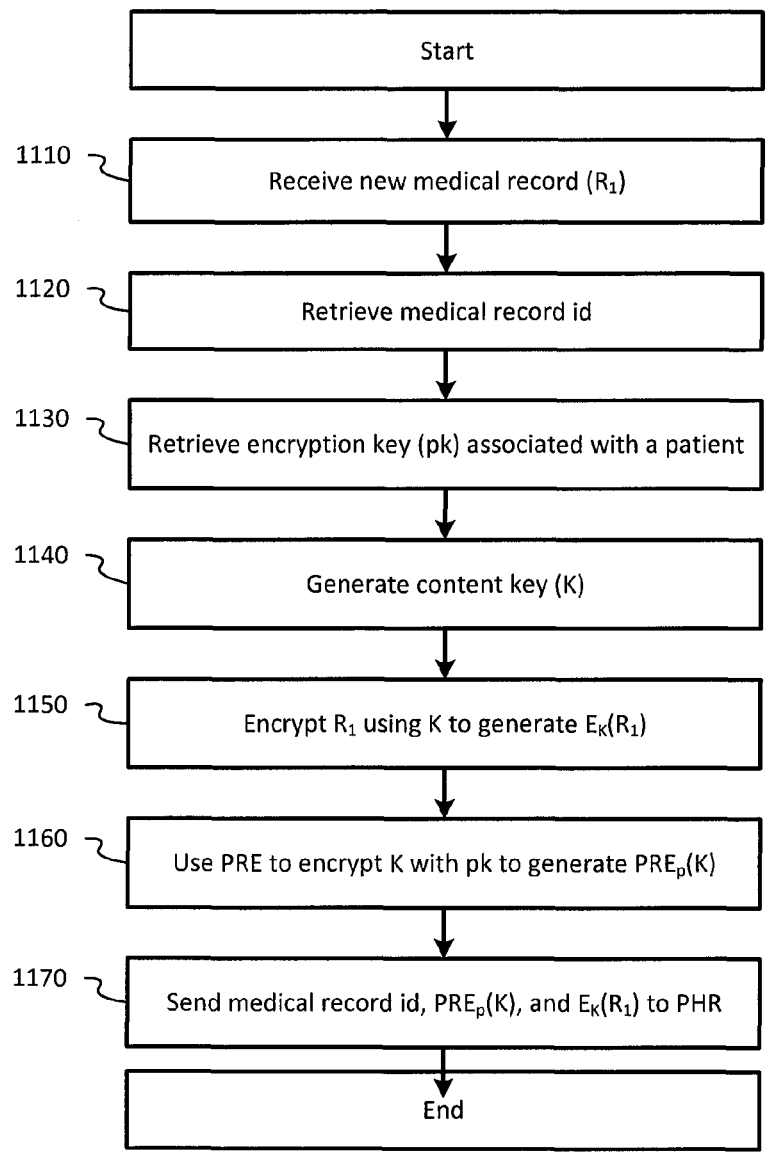
FIG. 11 is a flowchart of an illustrative embodiment of a method for generating an encrypted medical record according to encryption techniques of embodiments.

Referring to FIG. 11, a flowchart of an illustrative embodiment of a method generating an encrypted medical record according to encryption techniques of embodiments is shown as a method 1100. In an embodiment, the method 1100 may be performed by the third device 1010 and/or the fourth device 1020 of FIG. 10. In an embodiment, the method 1100 may be stored as instructions in a memory (e.g., the memory of the third device 1010 and/or the fourth device 1020 of FIG. 10), where the instructions, when executed by one or more processors, cause the one or more processors to perform operations of the method 1100.

At 1110, the method 1100 includes receiving (or generating) a medical record ($R_1$), and, at 1120, retrieving a medical record identifier. At 1130, the method 100 includes retrieving an encryption key (pk), and, at 1140, generating a content key (K). In an embodiment, pk may correspond to a public key associated with a device operated by a patient (e.g., P.pk associated with the first device 110), where the medical record is associated with the patient. In an embodiment, K may be generated using dual hash chains, as described with reference to FIGS. 1-5, where the device generating the content key (e.g., one of the third device 1010 and the fourth device 1020 of FIG. 10) maintains a forward hash chain and receives backward hash chain values from a remote device (e.g., the second device 120 of FIGS. 1 and 10) that have been derived as described with reference to FIGS. 2 and 6-9. In an additional or alternative embodiment, the content key K may be randomly generated. At 1150, the method 1100 includes encrypting $R_1$ using K to generate an encrypted medical record ($E_K(R_1)$), and, at 1160, using proxy re-encryption (PRE) to encrypt K using pk to generate a PRE-encrypted content key $PRE_p(K)$ that may be decrypted by the device associated with the patient using a secret key (P.sk). Thus, the patient device may decrypt the encrypted $R_1$ using $PRE_p(K)$ by decrypting $PRE_p(K)$ with P.sk to obtain K, which in turn may be used to decrypt $E_K(R_1)$. In an embodiment, after generating $PRE_p(K)$, K may be deleted, thereby preventing the device that generated K from decrypting $E_K(R_1)$, since a secret key (P.sk) that may be used to decrypt the content key K that has been encrypted using pk is not known to the device, where P.sk is the secret key associated with the patient device. Without access to P.sk, $PRE_p(K)$ may not be decrypted to obtain K, which may then be used to decrypt $E_K(R_1)$. Thus, after K is deleted, only the patient device may decrypt $PRE_p(K)$ and $E_K(R_1)$.

At 1170, the method 1100 includes sending medical record information to a remote device (e.g., the second device 120 of FIGS. 1 and 10). In an embodiment, the medical record information may include the encrypted content (e.g., $PRE_p(K)$, $E_K(R_1)$), and the medical record identifier (which may not be encrypted). In an embodiment, the remote device may be a cloud server or another form of server adapted to store and distribute content according to embodiments. As briefly explained above, the medical record identifier may not be encrypted. Thus, the medical record identifier may be used to identify the encrypted medical record, even though the content of the medical record may not be known or accessible due to the encryption.

The method 1100 may provide an improved technique for distributing encrypted content. For example, generating content keys using dual hash chains in accordance with embodiments, may provide improved encryption resiliency, as described above. Additionally, by using PRE to re-encrypt the content key K with the patient's public key (P.pk), and then deleting K, only the patient, or parties that the patient has granted access rights to may decrypt the content. Additionally, because the content key K may be derived by the patient device (e.g., using P.sk), the patient device does not require knowledge of forward hash chain values, forward seeds, backward hash chain values, or backward seeds. Thus, knowledge of the information used to generate K may be kept from the patient device, thereby separating the encrypted content from the access grant right. That is to say that, although encryption of the content may be performed by a medical service provider device, the medical service provider device may not be granted authority to grant access to the encrypted content. Rather, the access rights may be granted by the patient device, which is not involved in the generation of K and the generation of the encrypted content, other than providing P.pk to the medical service provider device. Additionally, the patient device is not required to be in communication with the medical service provider device at the time that the encrypted content is generated. Additional illustrative aspects and advantages of embodiments for distributing and/or granting access to the encrypted content stored at the remote device are described below with reference to FIGS. 12 and 13. Additionally, it is noted that, although FIG. 11 has been described as a method for encrypting medical records, the method 1100 of embodiments may be used to encrypt information other than medical records, such as multimedia files, documents, e-mails, etc.

Figure 12:
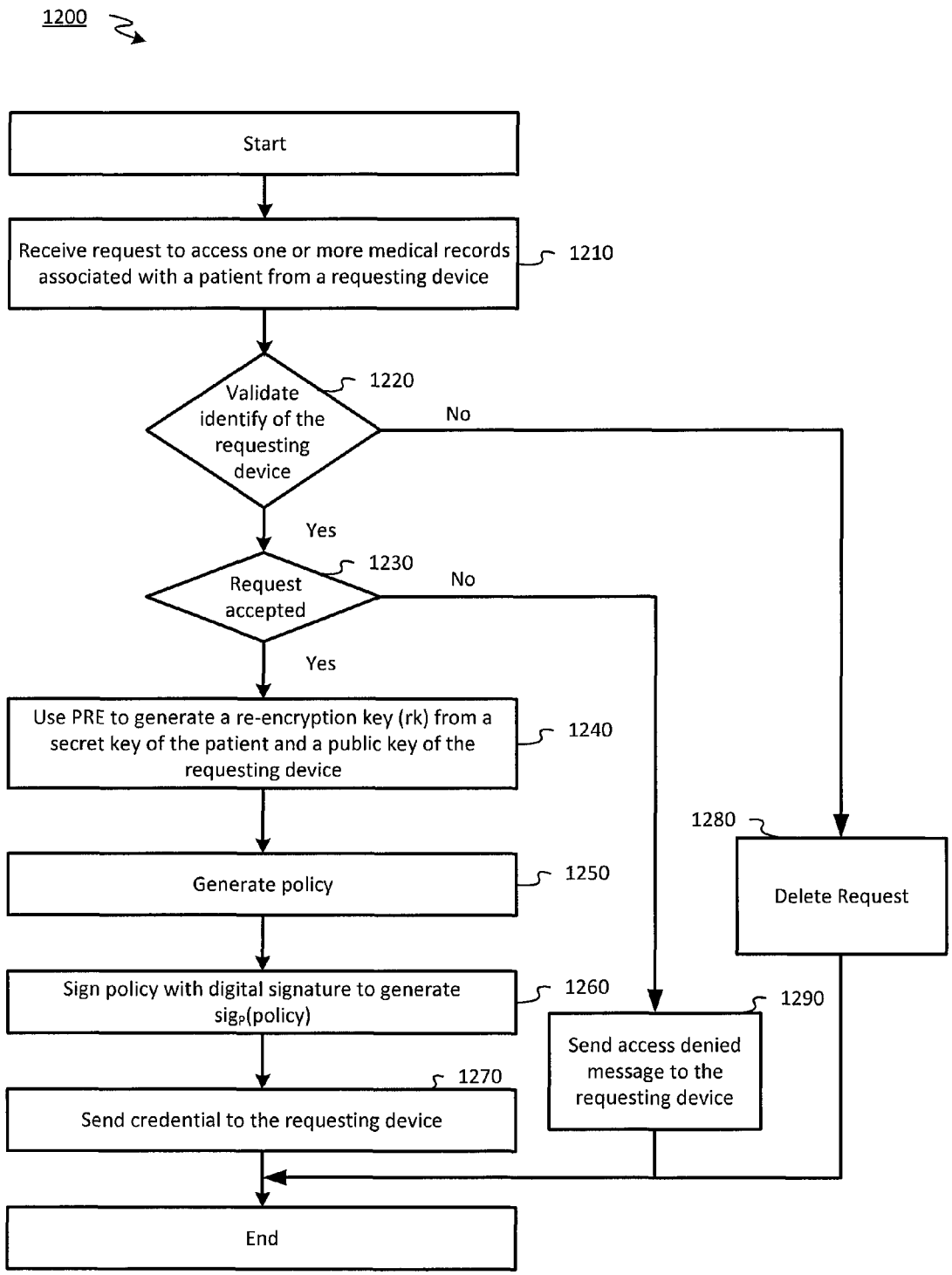
FIG. 12 is a flowchart of an illustrative embodiment of a method for generating a credential for granting access to content that has been encrypted according to embodiments.

Referring to FIG. 12, a flowchart of an illustrative embodiment of a method for generating a credential for granting access to content that has been encrypted according to embodiments is shown as a method 1200. In an embodiment, the method 1200 may be performed by the first device 110 of FIGS. 1 and 10. In an embodiment, the method 1200 may be stored as instructions in a memory (e.g., the memory of the first device 110 of FIGS. 1 and 10), where the instructions, when executed by one or more processors, cause the one or more processors to perform operations of the method 1200.

At 1210, the method 1200 includes receiving a request to access one or more medical records. In an embodiment, the one or more medical records may include the medical record $R_1$ generated as described with reference to FIG. 11. In an embodiment, the request may include information associated with an identity of the requester (e.g., an identity of an operator of the third device 1010 or the fourth device 1020 of FIG. 10). The information associated with the identity of the requester may include an identifier identifying the requester (or the requesting device). Additionally, in an embodiment, the request may include a public key (D.pk) associated with the requesting device. Further, in an embodiment, the request may include a list of medical records for which access is being requested (e.g., $R_1$ and other medical records) and may include a plurality of medical record identifiers, each corresponding to one of the medical records included in the list.

At 1220, the method 1200 includes validating an identity of the requesting device. In an embodiment, validating the identity of the requesting device may include determining whether D.pk is valid for the information associated with the identity of the requester. In an additional or alternative embodiment, validating the identity of the requesting device may include determining whether a public key infrastructure (PKI) certificate accompanying D.pk is present, where the PKI certificate is issued by a trusted third party to certify the validity of the requester's public key (e.g., D.pk). This may reduce a likelihood that an attacker may impersonate a valid requesting device by submitting the attacker's public key with the request. In response to a determination that the identity of the requesting device is invalid, the method 1200 may include, at 1280, deleting the request. In response to a determination, at 1220, that the identity of the requesting device is valid, the method 1200 includes, at 1230, determining whether to accept the request. In an embodiment, determining whether to accept the request may include determining whether to grant the requesting device access to the one or more medical records. In an additional or alternative embodiment, determining whether to accept the request may include determining select medical records of the one or more medical records for which access by the requesting device is to be granted, where the selected medical records may include some, but not all, of the one or more medical records, or may include all of the one or more medical records. A policy, described below, may indicate each of the one or more medical records for which access has been requested by the requesting device, and may indicate, for each of the one or more medical records, whether access has been granted or denied. In an embodiment, a graphical user interface may be presented to the patient to allow the patient to select the medical records for which access is to be granted, where access is denied to non-selected medical records. It is noted that other techniques may be used to selectively grant access to medical records (or other types of files and data), such as profile based techniques, and are not described in detail herein for simplicity of the disclosure.

In response to a determination, at 1230, that the request is not to be accepted, the method 1200 may include, at 1290, sending an access denied message to the requesting device. In response to a determination, at 1230, that the request is to be accepted, the method 1200 may include, at 1240, generating a re-encryption key (rk) that may be used by the requesting device to decrypt the one or more medical records for which access has been granted. In an embodiment, rk may be generated using D.pk and P.sk, where P.sk is the secret key associated with the patient (e.g., an operator of the first device 110 of FIGS. 1 and 10) and may be used to decrypt content that has been encrypted using P.pk, as described with reference to FIG. 11. The re-encryption key rk, may enable the requesting device to decrypt the one or more medical records that have been encrypted as described above with reference to FIG. 11 using a secret key D.sk associated with the requesting device. Thus, rk may enable the requesting device to decrypt the one or more medical records without providing P.sk to the requesting device. In an additional or alternative embodiment, rk may be provided to a cloud storage provider or a server (e.g., a cloud storage provider or server storing the encrypted content) to allow the cloud storage provider or server to re-encrypt/transform the encrypted medical record into a ciphertext which can be decrypted with the requester's secret key. Thus, the cloud storage provider or server may use rk to transform the encrypted content so that it may be provided to the requesting device as a new re-encrypted ciphertext which can be decrypted with D.sk. In this embodiment, the cloud storage provider or server may be provided rk, and may re-encrypt the encrypted content using rk, but may not be able to decrypt the content because D.sk and P.sk are not known to the cloud storage provider or server.

At 1250, the method 1200 includes generating a policy. In an embodiment, the policy may identify the one or more medical records for which the requesting device has been granted access. Additionally, the policy may indicate one or more conditions associated with access of the one or more medical records by the requesting device. For example, the one or more conditions may indicate that requesting device has been granted access for a limited duration (e.g., a day, a week, a month, etc.), such as by including an expiration date for the policy. Additionally, the one or more conditions may indicate a type of access (e.g., read only, read-write, delete, etc.) that has been granted to the requesting device with respect to the one or more medical records. The one or more conditions may include other conditions not described herein for simplicity of the present disclosure, however, the present disclosure is not intended to be limited to the above-identified conditions.

At 1260, the method 1200 includes generating a signed copy of the policy using a digital signature associated with the device (e.g., the first device 110 of FIGS. 1 and 10) granting access to the one or more medical records. In an embodiment, the patient's secret key (P.sk) may be used to digitally sign the policy for the server to verify the authenticity of the policy statement. Additional aspects and advantages of signing the policy using a digital signature are described with reference to FIG. 13.

At 1270, the method 1200 includes generating and sending a credential to the requesting device. In an embodiment, the credential includes the re-encryption key rk, the policy, and the signed copy of the policy ($sig_P(policy)$). One reason for including both the policy and the signed copy of the policy is that the policy may not necessarily be recoverable from the digitally signed copy of the policy. For example, while the policy may possibly be recovered from the digitally signed copy of the policy using an RSA signature, the same does not hold for digital signatures utilizing digital signature algorithm (DSA) techniques or other discrete log based signature schemes. In hash-and-sign paradigms, which are widely used in signature schemes, a hash value of the content is recovered from the signature, rather than the content itself, and it is usually difficult or impossible to recover the content from its hash value. The requesting device may present the credential to a remote device (e.g., the second device 120 of FIGS. 1 and 10), where the one or more medical records are stored to obtain access to the one or more medical records. The remote device may validate the policy and provide the one or more medical records to the requesting device, as described in more detail with reference to FIG. 13.

Thus, the method 1200 provides an encryption technique that may generate a credential granting fine-grained access (e.g., access to some, but not necessarily all) to one or more medical records. Additionally, the method 1200 provides for generating a re-encryption key that may be used to decrypt the one or more medical records without providing a secret key (e.g., P.sk) to the requesting device, or allow the server to transform the encrypted content to a form that can be decrypted by the requesting device without needing to provide a secret key to the server, which may make systems employing encryption techniques of embodiments more robust and resilient. Additional advantages and aspects of generating a credential according to the method 1200 will be apparent from the description of FIG. 13. Further, it is noted that, although FIG. 12 has been described as a method for encrypting medical records, the method 1200 of embodiments may be used to encrypt information other than medical records, such as multimedia files, documents, e-mails, etc.

Figure 13:
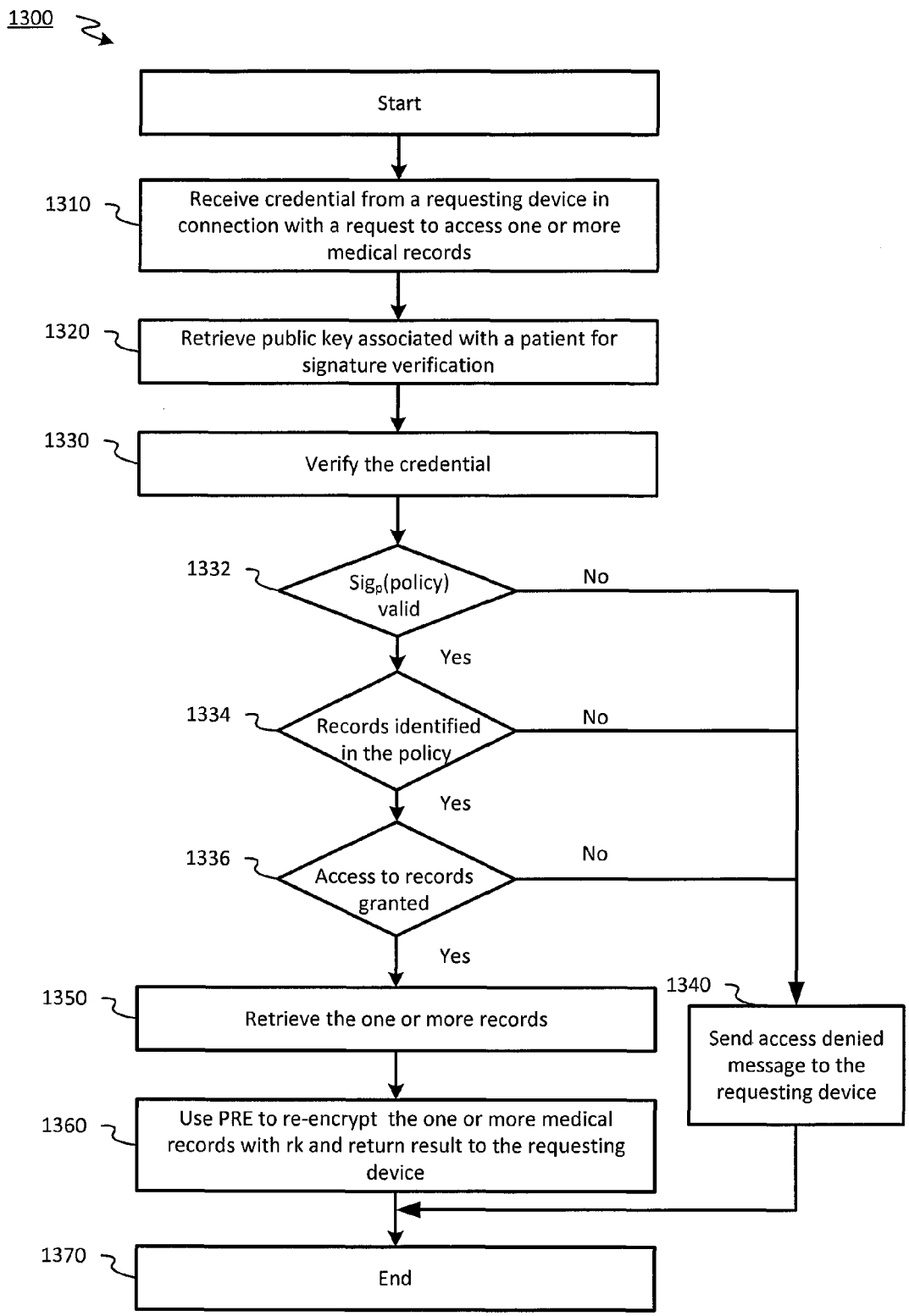
FIG. 13 is a flowchart of an illustrative embodiment of a method for validating a credential in connection with providing access to encrypted content.

Referring to FIG. 13, a flowchart of an illustrative embodiment of a method for validating a credential in connection with providing access to encrypted content is shown as a method 1300. In an embodiment, the method 1300 may be performed by the second device 120 of FIGS. 1 and 10. In an embodiment, the method 1200 may be stored as instructions in a memory (e.g., the memory of the second device 120 of FIGS. 1 and 10), where the instructions, when executed by one or more processors, cause the one or more processors to perform operations of the method 1300.

At 1310, the method 1300 includes receiving a credential from a requesting device in connection with a request to access one or more medical records. In an embodiment, the credential may be the credential described with reference to FIG. 12. For example, the credential may include a re-encryption key rk, a policy, and a signed policy, where the re-encryption key rk may be used to re-encrypt the one or more medical records for which access is provided, such that the requesting device may decrypt the one or more medical records using a private key associated with the requesting device, as described above with reference to FIG. 12, and where the policy identifies the one or more medical records for which access by the requesting device has been granted. At 1320, the method 1300 includes retrieving a public key associated with the device that generated the credential. In an embodiment, the public key may be a public key (e.g., P.pk), as described above with respect to FIG. 12. In an embodiment, the public key may be used to verify a signature or a signed policy statement (e.g., $sig_P(policy)$), as described above.

At 1330, the method 1300 includes verifying the credential. In an embodiment, verifying the credential may include, at 1332, determining whether the signed policy is valid. In an embodiment, the determination of whether the signed policy is valid may include decrypting the signed policy using P.pk (e.g., the encryption key retrieved at 1320). In an additional or alternative embodiment, the determination of whether the signed policy is valid may utilize DSA techniques or elliptic curve DSA techniques. In response to a determination that the signed policy is not valid, the method 1300 may include, at 1340, sending an access denied message to the requesting device. In response to a determination that the signed policy is valid, the method 1300 may include, at 1334, determining whether the one or more medical records for which the requesting device has requested access are identified in the policy. In response to a determination that one or more medical records for which access has been requested are not identified in the policy, the method 1300 may include, at 1340, sending an access denied message to the requesting device. In response to a determination that one or more medical records for which access has been requested are identified in the policy, the method 1300 may include, at 1336, determining whether access has been granted to the requesting device for each of the one or more requested medical records. In response to a determination that access has not been granted for at least one of the one or more requested medical records, the method 1300 may include, at 1340, sending an access denied message to the requesting device.

In response to a determination that access has been granted for each of the one or more requested medical records, the method 1300 may include, at 1350, retrieving the one or more requested medical records, and, at 1360, using proxy re-encryption (PRE) to re-encrypt the one or more medical records, and providing the re-encrypted medical records to the requesting device. In an embodiment, re-encrypting the one or more medical records using PRE may include re-encrypting the one or more medical records using the re-encryption key rk included in the credential. Thus, the requesting device may be able to decrypt the re-encrypted one or more medical records using a secret key (D.sk) associated with the requesting device.

The method 1300 may provide an improved technique for distributing content using PRE. For example, during the method 1300, the device that provides the re-encrypted one or more medical records to the requesting device may not have access to, or be able to decrypt the one or more medical records. Thus, at no time during the method 1300 does the device have knowledge of the contents of the one or more medical records. Additionally, at no point during the method 1300 does the requesting device or the device providing the one or more medical records to the requesting device obtain the secret key of the patient (e.g., P.sk) which could be used to decrypt the one or more medical records, which may make systems employing encryption techniques of embodiments more robust and resilient. It is also noted that the method 1300 provides a technique of embodiments for providing fine-grained access to medical records without requiring involvement from the patient at the time the content is provided to the requesting device. Thus, access to the medical records may be obtained by the requesting device even if the patient is not accessible or online. Further, it is noted that, although FIG. 13 has been described as a method for encrypting (or re-encrypting) medical records, the method 1300 of embodiments may be used to encrypt (or re-encrypt) information other than medical records, such as multimedia files, documents, e-mails, etc.

It is noted that, although FIGS. 1-13 have been described with respect to encryption of content and sharing of encrypted content between networked devices, such as networked computers, networked servers, etc., the encryption techniques of embodiments may be readily used in other settings as well. For example, as described with reference to FIG. 5 and elsewhere herein, the encryption techniques of embodiments may reduce the computational complexity of encrypting content, and may reduce an amount of computational resources required to encrypt and decrypt the content. Thus, the encryption techniques of embodiments may be well suited for applications in devices having limited computational resources, such as devices adapted to operate as part of an internet of things (IoT), such as wearable devices, sensor nodes, etc. Additionally, the encryption techniques of embodiments may be well suited for embedded devices, such as health monitoring devices, and for applications utilizing cloud storage systems.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
generating, by a first device, a forward seed and a backward seed, wherein the forward seed and the backward seed are used to generate a forward hash chain and a backward hash chain, and wherein hash values derived from the forward hash chain and the backward hash chain are used to generate content keys for encrypting and decrypting content;
encrypting, by the first device, the forward seed and the backward seed using proxy re-encryption to produce encrypted seed information;
initiating, by the first device, transmission of the encrypted seed information and the backward seed to a second device, wherein the second device stores the backward seed and the encrypted seed information; and
encrypting, by the first device, first content using a first content key to produce first encrypted content, wherein the first content key is generated based on a forward hash chain value associated with the forward hash chain and a backward hash chain value associated with the backward hash chain, and wherein the backward hash chain value is received from the second device.

2. The method of claim 1, wherein the method includes generating a second forward hash chain value by hashing the forward hash chain using a one-way function.

3. The method of claim 2, wherein the method includes generating a second content key based on the second forward hash chain value and a current backward hash chain value received from the second device.

4. The method of claim 3, wherein the second device generates the current backward hash chain value by hashing the backward hash chain using the one-way function.

5. The method of claim 4, wherein a frequency for performing the hashing of the backward hash chain to generate the current backward hash chain value and the hashing of the forward hash chain to generate a current forward hash chain value are different.

6. The method of claim 2, wherein the method includes:
storing a first hash count corresponding to a number of times that the forward hash chain has been hashed using the one-way function, wherein a value of the first hash count is updated each time that the forward hash chain is hashed using the one-way function; and
storing a second hash count corresponding to a number of backward hash chain values received from the second device, wherein a value of the second hash count is updated each time a new backward hash chain value is received from the second device.

7. The method of claim 6, wherein the method includes providing the first encrypted content, a current value of the first hash count, and a current value of the second hash count to the second device.

8. The method of claim 6, wherein the method includes:
in response to receiving the backward hash chain value from the second device, determining whether the backward hash chain value is a new backward hash chain value; and
in response to a determination that the backward hash chain value is a new backward hash chain value, updating the second hash count.

9. The method of claim 6, wherein the method includes updating the first hash count each time that the forward hash chain is hashed using the one-way function.

10. The method of claim 1, wherein the first content key is generated based on a bitwise exclusive or (XOR) of the forward hash chain value and the backward hash chain value.

11. The method of claim 1, wherein the method includes:
receiving a request to access the first encrypted content from a third device, wherein the request includes identity information associated with an identity of the third device;
determining whether the identity information is valid; and
in response to a determination that the identity information is valid:
generating a re-encryption key and a policy;
signing the policy using a digital signature; and
sending an authorization message to the third device, wherein the authorization message includes the re-encryption key, the policy, and the digital signature, and wherein the authorization message may be provided from the third device to the second device to provide the third device with access to the first encrypted content.

12. The method of claim 11, wherein the method includes determining whether to grant the third device with access to the first encrypted content in response to a determination that the identity information is valid, wherein the re-encryption key, the policy, and the digital signature are generated in response to a determination to grant the second device with access to the first encrypted content.

13. The method of claim 11, wherein the authorization message grants the third device with access to at least the first encrypted content and denies access to other encrypted content by the third device.

14. The method of claim 1, wherein encrypting the seed information using proxy re-encryption includes encrypting the seed information based on a public key associated with the first device.

15. An apparatus comprising:
at least one processor configured to:
generate a forward seed and a backward seed, wherein the forward seed and the backward seed are used to generate a forward hash chain and a backward hash chain, and wherein hash values derived from the forward hash chain and the backward hash chain are used to generate content keys for encrypting and decrypting content;
encrypt the forward seed and the backward seed using a proxy re-encryption technique to produce encrypted seed information;
initiate transmission of the encrypted seed information and the backward seed to a remote device, wherein the remote device stores the backward seed and the encrypted seed information; and
encrypt first content using a first content key to produce first encrypted content, wherein the first content key is generated based on a forward hash chain value associated with the forward hash chain and a backward hash chain value associated with the backward hash chain, and wherein the backward hash chain value is received from the remote device; and
a memory coupled to the processor.

16. The apparatus of claim 15, wherein the at least one processor is configured to generate a second forward hash chain value by hashing the forward hash chain using a one-way function.

17. The apparatus of claim 16, wherein the at least one processor is configured to generate a second content key based on the second forward hash chain value and a current backward hash chain value received from the remote device.

18. The apparatus of claim 17, wherein the remote device generates the current backward hash chain value by hashing the backward hash chain using the one-way function.

19. The apparatus of claim 18, wherein a frequency for hashing the backward hash chain to generate the current backward hash chain value and a frequency for hashing the forward hash chain to generate a current forward hash chain value are different.

20. The apparatus of claim 16, wherein the at least one processor is configured to:
store a first hash count corresponding to a number of times that the forward hash chain has been hashed using the one-way function, wherein a value of the first hash count is updated each time that the forward hash chain is hashed using the one-way function;
store a second hash count corresponding to a number of backward hash chain values received from the remote device, wherein a value of the second hash count is updated each time a new backward hash chain value is received from the remote device;
provide the first encrypted content, a current value of the first hash count, and a current value of the second hash count to the remote device; and
update the first hash count each time that the forward hash chain is hashed using the one-way function.

21. The apparatus of claim 20, wherein the at least one processor is configured to:
in response to receiving the backward hash chain value from the remote device, determining whether the backward hash chain value is a new backward hash chain value; and
in response to a determination that the backward hash chain value is a new backward hash chain value, updating the second hash count.

22. The apparatus of claim 20, wherein the at least one processor is configured to:
  retrieve a record associated with the first encrypted content from the remote device, wherein the record includes the encrypted seed information, the first encrypted content, the current value of the first hash count when the first encrypted content was generated, and the current value of the second hash count when the first encrypted content was generated;
  decrypt the encrypted seed information using a decryption key associated with an author of the first encrypted content to obtain the forward seed and the backward seed;
  hash the forward seed a first number of times to obtain the forward hash chain value, wherein the first number of times corresponds to the current value of the first hash count when the first encrypted content was generated;
  hash the backward seed a second number of times to obtain the backward hash chain value, wherein the second number of times corresponds to the current value of the second hash count when the first encrypted content was generated;
  generating the first content key for decrypting the first encrypted content based on the forward hash chain value and the backward hash chain value; and
  decrypting the first encrypted content using the first content key.

23. The apparatus of claim 15, wherein the first content key is generated based on a bitwise exclusive or (XOR) of the forward hash chain value and the backward hash chain value.

24. The apparatus of claim 15, wherein the at least one processor is configured to:
  receive a request to access the first encrypted content from a requesting device, wherein the request includes identity information associated with an identity of the requesting device;
  determine whether the identity information is valid;
  in response to a determination that the identity information is valid, determine whether to grant the requesting device with access to the first encrypted content;
  in response to a determination to grant the requesting device with access to the first encrypted content:
    generating a re-encryption key and a policy; and
    signing the policy using a digital signature; and
  sending an authorization message to the requesting device, wherein the authorization message includes the re-encryption key, the policy, and the digital signature, wherein the authorization message may be provided from the requesting device to the remote device to provide the requesting device with access to the first encrypted content, wherein the authorization message grants the requesting device with access to at least the first encrypted content and denies access to other encrypted content by the requesting device.

25. A non-transitory computer-readable storage medium storing instructions that, when executed by a processor, cause the processor to perform operations comprising:
  receiving, from a first device, a message including encrypted information, and a backward seed at a second device, wherein the encrypted information includes a forward seed and the backward seed, and wherein the encrypted information is generated using a proxy re-encryption technique, wherein the forward seed and the backward seed are used to generate a forward hash chain and a backward hash chain, wherein the first device generates the forward hash chain, wherein the second device generates the backward hash chain, and wherein hash values derived from the forward hash chain and the backward hash chain are used by the first device to generate content keys for encrypting content;
  hashing the backward seed to generate a backward hash chain value;
  providing the backward hash chain value to the first device; and
  receiving first encrypted content from the first device, wherein the first encrypted content is encrypted using a content key generated using the backward hash chain value and a forward hash chain value; and
  storing the first encrypted content.

26. The non-transitory computer-readable storage medium of claim 25, wherein the operations include determining an update period associated with a frequency for hashing the backward hash chain, wherein the backward hash chain is hashed once during each update period, and wherein each time that the backward hash chain is hashed, a length of the backward hash chain increases.

27. The non-transitory computer-readable storage medium of claim 26, wherein the operations include:
  initializing a first counter based on the update period;
  updating a value of the first counter in response to receiving the first encrypted content, wherein the value of the first counter is updated each time encrypted content is received from the first device;
  determining whether the updated value of the first counter satisfies a threshold;
  in response to a determination that the updated value of the first counter satisfies the threshold, hashing the backward hash chain to generate a new backward hash chain value; and
  initiating transmission of the new backward hash chain value to the first device.

28. The non-transitory computer-readable storage medium of claim 27, wherein the message includes a threshold backward hash chain length, and wherein the operations include:
  initializing a second counter, wherein the second counter is associated with a length of the backward hash chain;
  updating a value of the second counter in response to hashing the backward hash chain; and
  determining whether the value of the second counter satisfies the threshold backward hash chain length.

29. The non-transitory computer-readable storage medium of claim 28, wherein the operations include re-initializing the backward hash chain based on the backward seed in response to a determination that the value of the second counter satisfies the threshold backward hash chain value.

30. The non-transitory computer-readable storage medium of claim 25, wherein the operations include generating a table of pre-computed backward hash chain values associated with the backward hash chain in response to receiving the backward seed, wherein subsequent backward hash chain values for transmission to the first device are determined based on the table.

31. The non-transitory computer-readable storage medium of claim 30, wherein the operations include:
  determining whether a next subsequent backward hash chain value is stored in the table; and
  in response to a determination that the next subsequent backward hash chain value is stored in the table, selecting the next subsequent backward hash chain value from the table; and
  initiating transmission of the next subsequent backward hash chain value to the first device.

32. The non-transitory computer-readable storage medium of claim 31, wherein the operations include:

determining a distance between the pre-computed backward hash chain values;

in response to a determination that the next subsequent backward hash chain value is not stored in the table:

determining a particular pre-computed backward hash chain value included in the table that is closest to the next subsequent backward hash chain value; and hashing the particular pre-computed backward hash chain value to generate the next subsequent backward hash chain value; and initiating transmission of the next subsequent backward hash chain value to the first device.

33. The non-transitory computer-readable storage medium of claim 25, wherein the operations include:

receiving a request to access the first encrypted content from a third device, wherein the request includes a signed policy and a re-encryption key generated by the first device;

verifying the signed policy using a public key associated with the first device;

in response to verifying the signed policy, determining whether access to the first encrypted content by the third device is authorized based on information included in the signed policy;

in response to a determination that access to the first encrypted content by the third device is authorized, performing proxy re-encryption of the first encrypted content using the re-encryption key included in the request to produce re-encrypted content; and transmitting the re-encrypted content to the third device, wherein the third device is adapted to decrypt the re-encrypted content using a key associated with the third device.

* * * * *